US011208880B2

(12) United States Patent
Yeung et al.

(10) Patent No.: US 11,208,880 B2
(45) Date of Patent: Dec. 28, 2021

(54) BI-FUEL RECIPROCATING ENGINE TO POWER DIRECT DRIVE TURBINE FRACTURING PUMPS ONBOARD AUXILIARY SYSTEMS AND RELATED METHODS

(71) Applicant: BJ Energy Solutions, LLC, Houston, TX (US)

(72) Inventors: Tony Yeung, Tomball, TX (US); Ricardo Rodriguez-Ramon, Tomball, TX (US); Guillermo Rodriguez, Tomball, TX (US)

(73) Assignee: BJ Energy Solutions, LLC, Houston, TX (US)

( * ) Notice: Subject to any disclaimer, the term of this patent is extended or adjusted under 35 U.S.C. 154(b) by 0 days.

(21) Appl. No.: 17/301,241

(22) Filed: Mar. 30, 2021

(65) Prior Publication Data

US 2021/0372256 A1 Dec. 2, 2021

Related U.S. Application Data

(60) Provisional application No. 62/705,188, filed on Jun. 15, 2020, provisional application No. 62/704,774, filed on May 28, 2020.

(51) Int. Cl.
*F02M 21/02* (2006.01)
*E21B 43/26* (2006.01)
(Continued)

(52) U.S. Cl.
CPC ....... *E21B 43/2607* (2020.05); *F02M 21/023* (2013.01); *F02M 37/0017* (2013.01);
(Continued)

(58) Field of Classification Search
CPC .. F04B 17/00; F02M 37/0076; F02M 55/025; F02M 21/023; F02M 37/0017; F02M 37/0023
See application file for complete search history.

(56) References Cited

U.S. PATENT DOCUMENTS 2,498,229 A 2/1950 Adler
2,940,377 A 6/1960 Darnell et al.
(Continued)

FOREIGN PATENT DOCUMENTS

CA 2043184 8/1994
CA 2829762 9/2012
(Continued)

OTHER PUBLICATIONS

ResearchGate, Answer by Byron Woolridge, found at https://www.researchgate.net/post/How_can_we_improve_the_efficiency_of_the_gas_turbine_cycles, Jan. 1, 2013.
(Continued)

*Primary Examiner* — Hung Q Nguyen
(74) *Attorney, Agent, or Firm* — Womble Bond Dickinson (US) LLP

(57) ABSTRACT

Systems and methods for supplying primary fuel and secondary fuel to an internal combustion engine may include supplying a first amount of the primary fuel and a second amount of the secondary fuel to the internal combustion engine. The system may include a first manifold to provide primary fuel to the internal combustion engine, and a primary valve associated with the first manifold to provide fluid flow between a primary fuel source and the internal combustion engine. A second manifold may provide secondary fuel to the internal combustion engine, and a fuel pump and/or a secondary valve may provide fluid flow between a secondary fuel source and the internal combustion engine. A controller may determine a total power load, the
(Continued)

first amount of primary fuel, and the second amount of secondary fuel to supply to the internal combustion engine to meet the total power load.

6 Claims, 5 Drawing Sheets

(51) Int. Cl.
*F04B 17/00* (2006.01)
*F04B 19/04* (2006.01)
*F02M 37/00* (2006.01)
*F02M 55/02* (2006.01)

(52) U.S. Cl.
CPC .... *F02M 37/0023* (2013.01); *F02M 37/0076* (2013.01); *F02M 55/025* (2013.01); *F04B 17/00* (2013.01); *F04B 19/04* (2013.01)

(56) References Cited

U.S. PATENT DOCUMENTS

| | | |
|---|---|---|
| 2,947,141 A | 8/1960 | Russ |
| 3,068,796 A | 12/1962 | Pfluger et al. |
| 3,191,517 A | 6/1965 | Solzman |
| 3,257,031 A | 6/1966 | Dietz |
| 3,378,074 A | 4/1968 | Kiel |
| 3,463,612 A | 8/1969 | Whitsel |
| 3,550,696 A | 12/1970 | Kenneday |
| 3,739,872 A | 6/1973 | McNair |
| 3,773,438 A | 11/1973 | Hall et al. |
| 3,786,835 A | 1/1974 | Finger |
| 3,791,682 A | 2/1974 | Mitchell |
| 3,796,045 A | 3/1974 | Foster |
| 3,820,922 A | 6/1974 | Buse et al. |
| 4,010,613 A | 3/1977 | McInerney |
| 4,031,407 A | 6/1977 | Reed |
| 4,059,045 A | 11/1977 | McClain |
| 4,086,976 A | 5/1978 | Holm et al. |
| 4,204,808 A | 5/1980 | Reese et al. |
| 4,222,229 A | 9/1980 | Uram |
| 4,269,569 A | 5/1981 | Hoover |
| 4,311,395 A | 1/1982 | Douthitt et al. |
| 4,330,237 A | 5/1982 | Battah |
| 4,357,027 A | 11/1982 | Zeitlow |
| 4,383,478 A | 5/1983 | Jones |
| 4,402,504 A | 9/1983 | Christian |
| 4,457,325 A | 7/1984 | Green |
| 4,470,771 A | 9/1984 | Hall et al. |
| 4,483,684 A | 11/1984 | Black |
| 4,574,880 A | 3/1986 | Handke |
| 4,584,654 A | 4/1986 | Crane |
| 4,672,813 A | 6/1987 | David |
| 4,754,607 A | 7/1988 | Mackay |
| 4,782,244 A | 11/1988 | Wakimoto |
| 4,796,777 A | 1/1989 | Keller |
| 4,869,209 A | 9/1989 | Young |
| 4,913,625 A | 4/1990 | Gerlowski |
| 4,983,259 A | 1/1991 | Duncan |
| 4,990,058 A | 2/1991 | Eslinger |
| 5,135,361 A | 8/1992 | Dion |
| 5,537,813 A | 7/1996 | Davis et al. |
| 5,553,514 A | 9/1996 | Walkowc |
| 5,560,195 A | 10/1996 | Anderson et al. |
| 5,586,444 A | 12/1996 | Fung |
| 5,622,245 A | 4/1997 | Reik |
| 5,626,103 A | 5/1997 | Flaws et al. |
| 5,651,400 A | 7/1997 | Corts et al. |
| 5,678,460 A | 10/1997 | Walkowc |
| 5,717,172 A | 2/1998 | Griffin, Jr. et al. |
| 5,720,598 A | 2/1998 | de Chizzelle |
| 5,983,962 A | 11/1999 | Gerardot |
| 6,041,856 A | 3/2000 | Thrasher et al. |
| 6,050,080 A | 4/2000 | Horner |
| 6,071,188 A | 6/2000 | D'Neill et al. |
| 6,074,170 A | 6/2000 | Bert et al. |
| 6,123,751 A | 9/2000 | Nelson et al. |
| 6,129,335 A | 10/2000 | Yokogi |
| 6,145,318 A | 11/2000 | Kaplan et al. |
| 6,230,481 B1 | 5/2001 | Jahr |
| 6,279,309 B1 | 8/2001 | Lawlor, II et al. |
| 6,321,860 B1 | 11/2001 | Reddoch |
| 6,334,746 B1 | 1/2002 | Nguyen et al. |
| 6,530,224 B1 | 3/2003 | Conchieri |
| 6,543,395 B2 | 4/2003 | Green |
| 6,655,922 B1 | 12/2003 | Flek |
| 6,765,304 B2 | 7/2004 | Baten et al. |
| 6,786,051 B2 | 9/2004 | Kristich et al. |
| 6,851,514 B2 | 2/2005 | Han et al. |
| 6,859,740 B2 | 2/2005 | Stephenson et al. |
| 6,901,735 B2 | 6/2005 | Lohn |
| 7,065,953 B1 | 6/2006 | Kopko |
| 7,143,016 B1 | 11/2006 | Discenzo et al. |
| 7,222,015 B2 | 5/2007 | Davis et al. |
| 7,388,303 B2 | 6/2008 | Seiver |
| 7,545,130 B2 | 6/2009 | Latham |
| 7,552,903 B2 | 6/2009 | Dunn et al. |
| 7,563,076 B2 | 7/2009 | Brunet et al. |
| 7,627,416 B2 | 12/2009 | Batenburg et al. |
| 7,677,316 B2 | 3/2010 | Butler et al. |
| 7,721,521 B2 | 5/2010 | Kunkle et al. |
| 7,730,711 B2 | 6/2010 | Kunkle et al. |
| 7,845,413 B2 | 12/2010 | Shampine et al. |
| 7,900,724 B2 | 3/2011 | Promersberger et al. |
| 7,921,914 B2 | 4/2011 | Bruins et al. |
| 7,938,151 B2 | 5/2011 | Höckner |
| 7,980,357 B2 | 7/2011 | Edwards |
| 8,083,504 B2 | 12/2011 | Williams et al. |
| 8,186,334 B2 | 5/2012 | Ooyama |
| 8,196,555 B2 | 6/2012 | Ikeda et al. |
| 8,316,936 B2 | 11/2012 | Roddy et al. |
| 8,414,673 B2 | 4/2013 | Raje et al. |
| 8,506,267 B2 | 8/2013 | Gambier et al. |
| 8,575,873 B2 | 11/2013 | Peterson et al. |
| 8,616,005 B1 | 12/2013 | Cousino, Sr. et al. |
| 8,621,873 B2 | 1/2014 | Robertson et al. |
| 8,672,606 B2 | 3/2014 | Glynn et al. |
| 8,714,253 B2 | 5/2014 | Sherwood et al. |
| 8,757,918 B2 | 6/2014 | Ramnarain et al. |
| 8,770,329 B2 | 7/2014 | Spitler |
| 8,784,081 B1 | 7/2014 | Blume |
| 8,789,601 B2 | 7/2014 | Broussard et al. |
| 8,794,307 B2 | 8/2014 | Coquilleau et al. |
| 8,801,394 B2 | 8/2014 | Anderson |
| 8,851,441 B2 | 10/2014 | Acuna et al. |
| 8,905,056 B2 | 12/2014 | Kendrick |
| 8,973,560 B2 | 3/2015 | Krug |
| 8,997,904 B2 | 4/2015 | Cryer et al. |
| 9,032,620 B2 | 5/2015 | Frassinelli et al. |
| 9,057,247 B2 | 6/2015 | Kumar et al. |
| 9,103,193 B2 | 8/2015 | Coli et al. |
| 9,121,257 B2 | 9/2015 | Coli et al. |
| 9,140,110 B2 | 9/2015 | Coli et al. |
| 9,187,982 B2 | 11/2015 | Dehring et al. |
| 9,206,667 B2 | 12/2015 | Khvoshchev et al. |
| 9,212,643 B2 | 12/2015 | Deliyski |
| 9,222,346 B1 | 12/2015 | Walls |
| 9,341,055 B2 | 5/2016 | Weightman et al. |
| 9,346,662 B2 | 5/2016 | Van Vliet et al. |
| 9,366,114 B2 | 6/2016 | Coli et al. |
| 9,376,786 B2 | 6/2016 | Numasawa |
| 9,394,829 B2 | 7/2016 | Cabeen et al. |
| 9,395,049 B2 | 7/2016 | Vicknair et al. |
| 9,401,670 B2 | 7/2016 | Minato et al. |
| 9,410,410 B2 | 8/2016 | Broussard et al. |
| 9,410,546 B2 | 8/2016 | Jaeger et al. |
| 9,429,078 B1 | 8/2016 | Crowe et al. |
| 9,488,169 B2 | 11/2016 | Cochran et al. |
| 9,493,997 B2 | 11/2016 | Liu et al. |
| 9,512,783 B2 | 12/2016 | Veilleux et al. |
| 9,534,473 B2 | 1/2017 | Morris et al. |
| 9,546,652 B2 | 1/2017 | Yin |
| 9,550,501 B2 | 1/2017 | Ledbetter |
| 9,556,721 B2 | 1/2017 | Jang et al. |

(56) References Cited

U.S. PATENT DOCUMENTS

| | | |
|---|---|---|
| 9,562,420 B2 | 2/2017 | Morris et al. |
| 9,570,945 B2 | 2/2017 | Fischer |
| 9,579,980 B2 | 2/2017 | Cryer et al. |
| 9,587,649 B2 | 3/2017 | Oehring |
| 9,611,728 B2 | 4/2017 | Oehring |
| 9,617,808 B2 | 4/2017 | Liu et al. |
| 9,638,101 B1 | 5/2017 | Crowe et al. |
| 9,638,194 B2 | 5/2017 | Wiegman et al. |
| 9,650,871 B2 | 5/2017 | Oehring et al. |
| 9,656,762 B2 | 5/2017 | Kamath et al. |
| 9,689,316 B1 | 6/2017 | Crom |
| 9,739,130 B2 | 8/2017 | Young |
| 9,764,266 B1 | 9/2017 | Carter |
| 9,777,748 B2 | 10/2017 | Lu et al. |
| 9,803,467 B2 | 10/2017 | Tang et al. |
| 9,803,793 B2 | 10/2017 | Davi et al. |
| 9,809,308 B2 | 11/2017 | Aguilar et al. |
| 9,829,002 B2 | 11/2017 | Crom |
| 9,840,897 B2 | 12/2017 | Larson |
| 9,840,901 B2 | 12/2017 | Oering et al. |
| 9,850,422 B2 | 12/2017 | Lestz et al. |
| 9,856,131 B1 | 1/2018 | Moffitt |
| 9,863,279 B2 | 1/2018 | Laing et al. |
| 9,869,305 B1 | 1/2018 | Crowe et al. |
| 9,879,609 B1 | 1/2018 | Crowe et al. |
| 9,893,500 B2 | 2/2018 | Oehring et al. |
| 9,893,660 B2 | 2/2018 | Peterson et al. |
| 9,920,615 B2 | 3/2018 | Zhang et al. |
| 9,945,365 B2 | 4/2018 | Hernandez et al. |
| 9,964,052 B2 | 5/2018 | Millican et al. |
| 9,970,278 B2 | 5/2018 | Broussard et al. |
| 9,981,840 B2 | 5/2018 | Shock |
| 9,995,102 B2 | 6/2018 | Dillie et al. |
| 9,995,218 B2 | 6/2018 | Oehring et al. |
| 10,008,880 B2 | 6/2018 | Vicknair et al. |
| 10,008,912 B2 | 6/2018 | Davey et al. |
| 10,018,096 B2 | 7/2018 | Wallimann et al. |
| 10,020,711 B2 | 7/2018 | Oehring et al. |
| 10,024,123 B2 | 7/2018 | Steffenhagen et al. |
| 10,029,289 B2 | 7/2018 | Wendorski et al. |
| 10,030,579 B2 | 7/2018 | Austin et al. |
| 10,036,238 B2 | 7/2018 | Oehring |
| 10,040,541 B2 | 8/2018 | Wilson et al. |
| 10,060,293 B2 | 8/2018 | Del Bono |
| 10,060,349 B2 | 8/2018 | Álvarez et al. |
| 10,082,137 B2 | 9/2018 | Graham et al. |
| 10,094,366 B2 | 10/2018 | Marica |
| 10,100,827 B2 | 10/2018 | Devan et al. |
| 10,107,084 B2 | 10/2018 | Coli et al. |
| 10,107,085 B2 | 10/2018 | Coli et al. |
| 10,114,061 B2 | 10/2018 | Frampton et al. |
| 10,119,381 B2 | 11/2018 | Oehring et al. |
| 10,134,257 B2 | 11/2018 | Zhang et al. |
| 10,138,098 B2 | 11/2018 | Sorensen et al. |
| 10,151,244 B2 | 12/2018 | Giancotti et al. |
| 10,174,599 B2 | 1/2019 | Shampine et al. |
| 10,184,397 B2 | 1/2019 | Austin et al. |
| 10,196,258 B2 | 2/2019 | Kalala et al. |
| 10,221,856 B2 | 3/2019 | Hernandez et al. |
| 10,227,854 B2 | 3/2019 | Glass |
| 10,227,855 B2 | 3/2019 | Coli et al. |
| 10,246,984 B2 | 4/2019 | Payne et al. |
| 10,247,182 B2 | 4/2019 | Zhang et al. |
| 10,254,732 B2 | 4/2019 | Oehring et al. |
| 10,267,439 B2 | 4/2019 | Pryce et al. |
| 10,280,724 B2 | 5/2019 | Hinderliter |
| 10,287,943 B1 | 5/2019 | Schiltz |
| 10,303,190 B2 | 5/2019 | Shock |
| 10,316,832 B2 | 6/2019 | Byrne |
| 10,317,875 B2 | 6/2019 | Pandurangan |
| 10,337,402 B2 | 7/2019 | Austin et al. |
| 10,358,035 B2 | 7/2019 | Cryer |
| 10,371,012 B2 | 8/2019 | Davis et al. |
| 10,374,485 B2 | 8/2019 | Morris et al. |
| 10,378,326 B2 | 8/2019 | Morris et al. |
| 10,393,108 B2 | 8/2019 | Chong et al. |
| 10,407,990 B2 | 9/2019 | Oehring et al. |
| 10,408,031 B2 | 9/2019 | Oehring et al. |
| 10,415,348 B2 | 9/2019 | Zhang et al. |
| 10,415,557 B1 | 9/2019 | Crowe et al. |
| 10,415,562 B2 | 9/2019 | Kajita et al. |
| RE47,695 E | 11/2019 | Case et al. |
| 10,465,689 B2 | 11/2019 | Crom |
| 10,478,753 B1 | 11/2019 | Elms et al. |
| 10,526,882 B2 | 1/2020 | Oehring et al. |
| 10,563,649 B2 | 2/2020 | Zhang et al. |
| 10,577,910 B2 | 3/2020 | Stephenson |
| 10,598,258 B2 | 3/2020 | Oehring et al. |
| 10,610,842 B2 | 4/2020 | Chong |
| 10,711,787 B1 | 7/2020 | Darley |
| 10,738,580 B1 | 8/2020 | Fischer et al. |
| 10,753,153 B1 | 8/2020 | Fischer et al. |
| 10,753,165 B1 | 8/2020 | Fischer et al. |
| 10,794,165 B2 | 10/2020 | Fischer et al. |
| 10,794,166 B2 | 10/2020 | Reckels et al. |
| 10,801,311 B1 | 10/2020 | Cui et al. |
| 10,815,764 B1 | 10/2020 | Yeung et al. |
| 10,815,978 B2 | 10/2020 | Glass |
| 10,830,032 B1 | 11/2020 | Zhang et al. |
| 10,859,203 B1 | 12/2020 | Cui et al. |
| 10,864,487 B1 | 12/2020 | Han et al. |
| 10,865,624 B1 | 12/2020 | Cui et al. |
| 10,865,631 B1 | 12/2020 | Zhang et al. |
| 10,870,093 B1 | 12/2020 | Zhong et al. |
| 10,895,202 B1 | 1/2021 | Yeung et al. |
| 10,907,459 B1 | 2/2021 | Yeung et al. |
| 10,927,774 B2 | 2/2021 | Cai et al. |
| 10,954,770 B1 | 3/2021 | Yeung et al. |
| 10,954,855 B1 | 3/2021 | Ji et al. |
| 10,961,908 B1 | 3/2021 | Yeung et al. |
| 10,961,912 B1 | 3/2021 | Yeung et al. |
| 10,961,914 B1 | 3/2021 | Yeung et al. |
| 10,961,993 B1 | 3/2021 | Ji et al. |
| 10,982,523 B1 | 4/2021 | Hill et al. |
| 10,989,019 B2 | 4/2021 | Cai et al. |
| 10,995,564 B2 | 5/2021 | Miller et al. |
| 11,035,214 B2 | 6/2021 | Cui et al. |
| 11,047,379 B1 | 6/2021 | Li et al. |
| 11,053,853 B1 | 7/2021 | Li et al. |
| 11,105,250 B1 | 8/2021 | Zhang et al. |
| 11,105,266 B2 | 8/2021 | Zhou et al. |
| 11,125,156 B2 | 9/2021 | Zhang et al. |
| 11,143,000 B2 | 10/2021 | Li et al. |
| 11,143,006 B1 | 10/2021 | Zhang et al. |
| 2004/0016245 A1 | 1/2004 | Pierson |
| 2004/0074238 A1 | 4/2004 | Wantanabe et al. |
| 2004/0076526 A1 | 4/2004 | Fukano et al. |
| 2004/0187950 A1 | 9/2004 | Cohen et al. |
| 2005/0051322 A1 | 3/2005 | Speer |
| 2005/0139286 A1 | 6/2005 | Poulter |
| 2005/0226754 A1 | 10/2005 | Orr et al. |
| 2006/0061091 A1 | 3/2006 | Osterloh |
| 2006/0062914 A1 | 3/2006 | Garg et al. |
| 2006/0211356 A1 | 9/2006 | Grassman |
| 2006/0260331 A1 | 11/2006 | Andreychuk |
| 2007/0029090 A1 | 2/2007 | Andreychuk et al. |
| 2007/0066406 A1 | 3/2007 | Keller et al. |
| 2007/0107981 A1 | 5/2007 | Sicotte |
| 2007/0125544 A1 | 6/2007 | Robinson et al. |
| 2007/0181212 A1 | 8/2007 | Fell |
| 2007/0277982 A1 | 12/2007 | Shampine et al. |
| 2007/0295569 A1 | 12/2007 | Manzoor et al. |
| 2008/0098891 A1 | 5/2008 | Feher |
| 2008/0161974 A1 | 7/2008 | Alston |
| 2008/0264625 A1 | 10/2008 | Ochoa |
| 2008/0264649 A1 | 10/2008 | Crawford |
| 2009/0064685 A1 | 3/2009 | Busekros et al. |
| 2009/0068031 A1 | 3/2009 | Gambier et al. |
| 2009/0124191 A1 | 5/2009 | Van Becelaere et al. |
| 2010/0071899 A1 | 3/2010 | Coquilleau et al. |
| 2010/0218508 A1 | 9/2010 | Brown et al. |
| 2010/0300683 A1 | 12/2010 | Looper et al. |
| 2010/0310384 A1 | 12/2010 | Stephenson et al. |
| 2011/0052423 A1 | 3/2011 | Gambier et al. |

(56) References Cited

U.S. PATENT DOCUMENTS

| | | |
|---|---|---|
| 2011/0054704 A1 | 3/2011 | Karpman et al. |
| 2011/0085924 A1 | 4/2011 | Shampine et al. |
| 2011/0146244 A1* | 6/2011 | Farman ............ F02D 9/04 60/285 |
| 2011/0146246 A1* | 6/2011 | Farman ............ F02D 41/005 60/286 |
| 2011/0197988 A1 | 8/2011 | Van Vliet et al. |
| 2011/0241888 A1 | 10/2011 | Lu et al. |
| 2011/0265443 A1 | 11/2011 | Ansari |
| 2011/0272158 A1 | 11/2011 | Neal |
| 2012/0048242 A1 | 3/2012 | Sumilla et al. |
| 2012/0137699 A1 | 6/2012 | Montagne et al. |
| 2012/0179444 A1 | 7/2012 | Ganguly et al. |
| 2012/0192542 A1 | 8/2012 | Chillar et al. |
| 2012/0199001 A1 | 8/2012 | Chillar et al. |
| 2012/0204627 A1 | 8/2012 | Underl et al. |
| 2012/0310509 A1 | 12/2012 | Pardo et al. |
| 2013/0068307 A1 | 3/2013 | Hains et al. |
| 2013/0087045 A1 | 4/2013 | Sullivan et al. |
| 2013/0087945 A1 | 4/2013 | Kusters et al. |
| 2013/0189915 A1 | 7/2013 | Hazard |
| 2013/0259707 A1 | 10/2013 | Yin |
| 2013/0284455 A1 | 10/2013 | Kajaria et al. |
| 2013/0300341 A1 | 11/2013 | Gillette |
| 2013/0306322 A1 | 11/2013 | Sanborn |
| 2014/0013768 A1 | 1/2014 | Laing et al. |
| 2014/0032082 A1* | 1/2014 | Gehrke ............ F02D 41/0057 701/104 |
| 2014/0044517 A1 | 2/2014 | Saha et al. |
| 2014/0048253 A1 | 2/2014 | Andreychuk |
| 2014/0090729 A1 | 4/2014 | Coulter et al. |
| 2014/0090742 A1 | 4/2014 | Coskrey et al. |
| 2014/0094105 A1 | 4/2014 | Lundh et al. |
| 2014/0130422 A1 | 5/2014 | Laing et al. |
| 2014/0144641 A1 | 5/2014 | Chandler |
| 2014/0147291 A1 | 5/2014 | Burnette |
| 2014/0216736 A1 | 8/2014 | Leugemors et al. |
| 2014/0219824 A1 | 8/2014 | Burnette |
| 2014/0277772 A1 | 9/2014 | Lopez et al. |
| 2014/0290266 A1 | 10/2014 | Veilleux, Jr. et al. |
| 2014/0318638 A1 | 10/2014 | Harwood et al. |
| 2015/0078924 A1 | 3/2015 | Zhang et al. |
| 2015/0101344 A1 | 4/2015 | Jarrier et al. |
| 2015/0114652 A1 | 4/2015 | Lestz et al. |
| 2015/0129210 A1 | 5/2015 | Chong et al. |
| 2015/0135659 A1 | 5/2015 | Jarrier et al. |
| 2015/0159553 A1 | 6/2015 | Kippel et al. |
| 2015/0192117 A1 | 7/2015 | Bridges |
| 2015/0204148 A1 | 7/2015 | Liu et al. |
| 2015/0204322 A1 | 7/2015 | Iund et al. |
| 2015/0211512 A1 | 7/2015 | Wiegman et al. |
| 2015/0217672 A1 | 8/2015 | Shampine et al. |
| 2015/0226140 A1* | 8/2015 | Zhang ............ F02M 21/0224 123/497 |
| 2015/0252661 A1 | 9/2015 | Glass |
| 2015/0275891 A1 | 10/2015 | Chong et al. |
| 2015/0340864 A1 | 11/2015 | Compton |
| 2015/0345385 A1 | 12/2015 | Santini |
| 2015/0369351 A1 | 12/2015 | Hermann et al. |
| 2016/0032703 A1* | 2/2016 | Broussard ............ E21B 43/26 166/250.01 |
| 2016/0102581 A1 | 4/2016 | Del Bono |
| 2016/0105022 A1 | 4/2016 | Oehring et al. |
| 2016/0108713 A1 | 4/2016 | Dunaeva et al. |
| 2016/0177675 A1 | 6/2016 | Morris et al. |
| 2016/0186671 A1 | 6/2016 | Austin et al. |
| 2016/0195082 A1 | 7/2016 | Wiegman et al. |
| 2016/0215774 A1 | 7/2016 | Oklejas et al. |
| 2016/0230525 A1 | 8/2016 | Lestz et al. |
| 2016/0244314 A1 | 8/2016 | Van Vliet et al. |
| 2016/0248230 A1 | 8/2016 | Tawy et al. |
| 2016/0253634 A1 | 9/2016 | Thomeer et al. |
| 2016/0258267 A1 | 9/2016 | Payne et al. |
| 2016/0273346 A1 | 9/2016 | Tang et al. |
| 2016/0290114 A1 | 10/2016 | Oehring et al. |
| 2016/0319650 A1 | 11/2016 | Oehring et al. |
| 2016/0326845 A1 | 11/2016 | Djikpesse et al. |
| 2016/0348479 A1 | 12/2016 | Oehring et al. |
| 2016/0369609 A1 | 12/2016 | Morris et al. |
| 2017/0009905 A1 | 1/2017 | Arnold |
| 2017/0016433 A1 | 1/2017 | Chong et al. |
| 2017/0030177 A1 | 2/2017 | Oehring et al. |
| 2017/0038137 A1 | 2/2017 | Turney |
| 2017/0074076 A1 | 3/2017 | Joseph et al. |
| 2017/0074089 A1 | 3/2017 | Agarwal et al. |
| 2017/0082110 A1 | 3/2017 | Lammers |
| 2017/0089189 A1 | 3/2017 | Norris et al. |
| 2017/0114613 A1 | 4/2017 | Lecerf et al. |
| 2017/0114625 A1 | 4/2017 | Norris et al. |
| 2017/0145918 A1 | 5/2017 | Oehring et al. |
| 2017/0191350 A1 | 7/2017 | Johns et al. |
| 2017/0218727 A1 | 8/2017 | Oehring et al. |
| 2017/0226839 A1 | 8/2017 | Broussard et al. |
| 2017/0226998 A1 | 8/2017 | Zhang et al. |
| 2017/0227002 A1 | 8/2017 | Mikulski et al. |
| 2017/0233103 A1 | 8/2017 | Teicholz et al. |
| 2017/0234165 A1 | 8/2017 | Kersey et al. |
| 2017/0234308 A1 | 8/2017 | Buckley |
| 2017/0248034 A1 | 8/2017 | Dzieciol et al. |
| 2017/0275149 A1 | 9/2017 | Schmidt |
| 2017/0292409 A1 | 10/2017 | Aguilar et al. |
| 2017/0302135 A1 | 10/2017 | Cory |
| 2017/0305736 A1 | 10/2017 | Haile et al. |
| 2017/0306847 A1 | 10/2017 | Suciu et al. |
| 2017/0322086 A1 | 11/2017 | Luharuka |
| 2017/0334448 A1 | 11/2017 | Schwunk |
| 2017/0335842 A1 | 11/2017 | Robinson et al. |
| 2017/0350471 A1 | 12/2017 | Steidl et al. |
| 2017/0370199 A1 | 12/2017 | Witkowski et al. |
| 2017/0370480 A1 | 12/2017 | Witkowski et al. |
| 2018/0034280 A1 | 2/2018 | Pedersen |
| 2018/0038328 A1 | 2/2018 | Louven et al. |
| 2018/0041093 A1 | 2/2018 | Miranda |
| 2018/0045202 A1 | 2/2018 | Crom |
| 2018/0038216 A1 | 3/2018 | Zhang et al. |
| 2018/0058171 A1 | 3/2018 | Roesner et al. |
| 2018/0156210 A1 | 6/2018 | Oehring et al. |
| 2018/0172294 A1 | 6/2018 | Owen |
| 2018/0183219 A1 | 6/2018 | Oehring et al. |
| 2018/0186442 A1 | 7/2018 | Maier |
| 2018/0187662 A1 | 7/2018 | Hill et al. |
| 2018/0209415 A1 | 7/2018 | Zhang et al. |
| 2018/0223640 A1 | 8/2018 | Keihany et al. |
| 2018/0224044 A1 | 8/2018 | Penney |
| 2018/0229998 A1 | 8/2018 | Shock |
| 2018/0258746 A1 | 9/2018 | Broussard et al. |
| 2018/0266412 A1 | 9/2018 | Stokkevag et al. |
| 2018/0278124 A1 | 9/2018 | Oehring et al. |
| 2018/0283102 A1 | 10/2018 | Cook |
| 2018/0283618 A1 | 10/2018 | Cook |
| 2018/0284817 A1 | 10/2018 | Cook et al. |
| 2018/0290877 A1 | 10/2018 | Shock |
| 2018/0291781 A1 | 10/2018 | Pedrini |
| 2018/0298731 A1 | 10/2018 | Bishop |
| 2018/0298735 A1 | 10/2018 | Conrad |
| 2018/0307255 A1 | 10/2018 | Bishop |
| 2018/0328157 A1 | 11/2018 | Bishop |
| 2018/0334893 A1 | 11/2018 | Oehring |
| 2018/0363435 A1 | 12/2018 | Coli et al. |
| 2018/0363436 A1 | 12/2018 | Coli et al. |
| 2018/0363437 A1 | 12/2018 | Coli et al. |
| 2018/0363438 A1 | 12/2018 | Coli et al. |
| 2019/0003272 A1 | 1/2019 | Morris et al. |
| 2019/0003329 A1 | 1/2019 | Morris et al. |
| 2019/0010793 A1 | 1/2019 | Hinderliter |
| 2019/0011051 A1 | 1/2019 | Yeung |
| 2019/0063341 A1 | 2/2019 | Davis |
| 2019/0067991 A1 | 2/2019 | Davis et al. |
| 2019/0071992 A1 | 3/2019 | Feng |
| 2019/0072005 A1 | 3/2019 | Fisher et al. |
| 2019/0078471 A1 | 3/2019 | Braglia et al. |
| 2019/0091619 A1 | 3/2019 | Huang |
| 2019/0106316 A1 | 4/2019 | Van Vliet et al. |

(56) References Cited

U.S. PATENT DOCUMENTS

| | | |
|---|---|---|
| 2019/0106970 A1 | 4/2019 | Oehring |
| 2019/0112908 A1 | 4/2019 | Coli et al. |
| 2019/0112910 A1 | 4/2019 | Oehring et al. |
| 2019/0119096 A1 | 4/2019 | Haile et al. |
| 2019/0120024 A1 | 4/2019 | Oehring et al. |
| 2019/0120031 A1 | 4/2019 | Gilje |
| 2019/0120134 A1 | 4/2019 | Goleczka et al. |
| 2019/0128247 A1 | 5/2019 | Douglas, III |
| 2019/0128288 A1 | 5/2019 | Konada et al. |
| 2019/0131607 A1 | 5/2019 | Gillette |
| 2019/0136677 A1 | 5/2019 | Shampine et al. |
| 2019/0153843 A1 | 5/2019 | Headrick |
| 2019/0154020 A1 | 5/2019 | Glass |
| 2019/0264667 A1 | 5/2019 | Byrne |
| 2019/0178234 A1 | 6/2019 | Beisel |
| 2019/0178235 A1 | 6/2019 | Coskrey et al. |
| 2019/0185312 A1 | 6/2019 | Bush et al. |
| 2019/0203572 A1 | 7/2019 | Morris et al. |
| 2019/0204021 A1 | 7/2019 | Morris et al. |
| 2019/0211814 A1 | 7/2019 | Weightman et al. |
| 2019/0217258 A1 | 7/2019 | Bishop |
| 2019/0226317 A1 | 7/2019 | Payne et al. |
| 2019/0245348 A1 | 8/2019 | Hinderliter et al. |
| 2019/0249652 A1 | 8/2019 | Stephenson et al. |
| 2019/0249754 A1 | 8/2019 | Oehring et al. |
| 2019/0257297 A1 | 8/2019 | Botting et al. |
| 2019/0277295 A1 | 9/2019 | Clybum et al. |
| 2019/0309585 A1 | 10/2019 | Miller et al. |
| 2019/0316447 A1 | 10/2019 | Oehring et al. |
| 2019/0316456 A1 | 10/2019 | Beisel et al. |
| 2019/0323337 A1 | 10/2019 | Glass et al. |
| 2019/0330923 A1 | 10/2019 | Gable et al. |
| 2019/0331117 A1 | 10/2019 | Gable et al. |
| 2019/0338762 A1 | 11/2019 | Curry et al. |
| 2019/0345920 A1 | 11/2019 | Surjaatmadja et al. |
| 2019/0353103 A1 | 11/2019 | Roberge |
| 2019/0356199 A1 | 11/2019 | Morris et al. |
| 2019/0376449 A1 | 12/2019 | Carrell |
| 2020/0003205 A1 | 1/2020 | Stokkevåg et al. |
| 2020/0011165 A1 | 1/2020 | George et al. |
| 2020/0040878 A1 | 2/2020 | Morris |
| 2020/0049136 A1 | 2/2020 | Stephenson |
| 2020/0049153 A1 | 2/2020 | Headrick et al. |
| 2020/0071998 A1 | 3/2020 | Oehring et al. |
| 2020/0072201 A1 | 3/2020 | Marica |
| 2020/0088202 A1 | 3/2020 | Sigmar et al. |
| 2020/0095854 A1 | 3/2020 | Hinderliter |
| 2020/0132058 A1 | 4/2020 | Mollatt |
| 2020/0141219 A1 | 5/2020 | Oehring et al. |
| 2020/0141907 A1 | 5/2020 | Meek et al. |
| 2020/0166026 A1 | 5/2020 | Marica |
| 2020/0206704 A1 | 7/2020 | Chong |
| 2020/0224645 A1 | 7/2020 | Buckley |
| 2020/0256333 A1 | 8/2020 | Surjaatmadja |
| 2020/0263498 A1 | 8/2020 | Fischer et al. |
| 2020/0263525 A1 | 8/2020 | Reid |
| 2020/0263526 A1 | 8/2020 | Fischer et al. |
| 2020/0263527 A1 | 8/2020 | Fischer et al. |
| 2020/0263528 A1 | 8/2020 | Fischer et al. |
| 2020/0267888 A1 | 8/2020 | Putz |
| 2020/0291731 A1 | 9/2020 | Haiderer et al. |
| 2020/0309113 A1 | 10/2020 | Hunter et al. |
| 2020/0325752 A1 | 10/2020 | Clark et al. |
| 2020/0325760 A1 | 10/2020 | Markham |
| 2020/0325761 A1 | 10/2020 | Williams |
| 2020/0325893 A1 | 10/2020 | Kraige et al. |
| 2020/0332784 A1 | 10/2020 | Zhang et al. |
| 2020/0332788 A1 | 10/2020 | Cui et al. |
| 2020/0340313 A1 | 10/2020 | Fischer et al. |
| 2020/0340340 A1 | 10/2020 | Oehring et al. |
| 2020/0340344 A1 | 10/2020 | Reckels et al. |
| 2020/0340404 A1 | 10/2020 | Stockstill |
| 2020/0347725 A1 | 11/2020 | Morris et al. |
| 2020/0362760 A1 | 11/2020 | Morenko et al. |
| 2020/0362764 A1 | 11/2020 | Saintignan et al. |
| 2020/0370394 A1 | 11/2020 | Cai et al. |
| 2020/0370408 A1 | 11/2020 | Cai et al. |
| 2020/0370429 A1 | 11/2020 | Cai et al. |
| 2020/0371490 A1 | 11/2020 | Cai et al. |
| 2020/0340322 A1 | 12/2020 | Sizemore et al. |
| 2020/0392826 A1 | 12/2020 | Cui et al. |
| 2020/0392827 A1 | 12/2020 | George et al. |
| 2020/0393088 A1 | 12/2020 | Sizemore et al. |
| 2020/0398238 A1 | 12/2020 | Zhong et al. |
| 2020/0400000 A1 | 12/2020 | Ghasripoor et al. |
| 2020/0400005 A1 | 12/2020 | Han et al. |
| 2020/0407625 A1 | 12/2020 | Stephenson |
| 2020/0408071 A1 | 12/2020 | Li et al. |
| 2020/0408144 A1 | 12/2020 | Feng et al. |
| 2020/0408147 A1 | 12/2020 | Zhang et al. |
| 2020/0408149 A1 | 12/2020 | Li et al. |
| 2021/0054727 A1 | 2/2021 | Floyd |
| 2021/0071574 A1 | 3/2021 | Feng et al. |
| 2021/0071579 A1 | 3/2021 | Li et al. |
| 2021/0071654 A1 | 3/2021 | Brunson |
| 2021/0071752 A1 | 3/2021 | Cui et al. |
| 2021/0086851 A1 | 3/2021 | Zhang et al. |
| 2021/0087883 A1 | 3/2021 | Zhang et al. |
| 2021/0087916 A1 | 3/2021 | Zhang et al. |
| 2021/0087925 A1 | 3/2021 | Heidari et al. |
| 2021/0087943 A1 | 3/2021 | Cui et al. |
| 2021/0088042 A1 | 3/2021 | Zhang et al. |
| 2021/0123425 A1 | 4/2021 | Cui et al. |
| 2021/0123434 A1 | 4/2021 | Cui et al. |
| 2021/0123435 A1 | 4/2021 | Cui et al. |
| 2021/0131409 A1 | 5/2021 | Cui et al. |
| 2021/0156240 A1 | 5/2021 | Cicci et al. |
| 2021/0156241 A1 | 5/2021 | Cook |
| 2021/0172282 A1 | 6/2021 | Wang et al. |
| 2021/0180517 A1 | 6/2021 | Zhou et al. |
| 2021/0246774 A1 | 8/2021 | Cui et al. |
| 2021/0285311 A1 | 9/2021 | Ji et al. |
| 2021/0285432 A1 | 9/2021 | Ji et al. |
| 2021/0301807 A1 | 9/2021 | Cui et al. |
| 2021/0308638 A1 | 10/2021 | Zhong et al. |

FOREIGN PATENT DOCUMENTS

| | | |
|---|---|---|
| CA | 2876687 A1 | 5/2014 |
| CA | 2693567 | 9/2014 |
| CA | 2876687 C | 4/2019 |
| CA | 2919175 | 3/2021 |
| CN | 2779054 | 5/2006 |
| CN | 2890325 | 4/2007 |
| CN | 200964929 Y | 10/2007 |
| CN | 101323151 A | 12/2008 |
| CN | 201190660 Y | 2/2009 |
| CN | 201190892 Y | 2/2009 |
| CN | 201190893 Y | 2/2009 |
| CN | 101414171 A | 4/2009 |
| CN | 201215073 Y | 4/2009 |
| CN | 201236650 Y | 5/2009 |
| CN | 201275542 Y | 7/2009 |
| CN | 201275801 Y | 7/2009 |
| CN | 201333385 Y | 10/2009 |
| CN | 201443300 U | 4/2010 |
| CN | 201496415 U | 6/2010 |
| CN | 201501365 U | 6/2010 |
| CN | 201507271 U | 6/2010 |
| CN | 101323151 B | 7/2010 |
| CN | 201560210 U | 8/2010 |
| CN | 201581862 U | 9/2010 |
| CN | 201610728 U | 10/2010 |
| CN | 201610751 U | 10/2010 |
| CN | 201618530 U | 11/2010 |
| CN | 201661255 U | 12/2010 |
| CN | 101949382 | 1/2011 |
| CN | 201756927 U | 3/2011 |
| CN | 101414171 B | 5/2011 |
| CN | 102128011 A | 7/2011 |
| CN | 102140898 A | 8/2011 |
| CN | 102155172 A | 8/2011 |
| CN | 202000930 U | 10/2011 |
| CN | 202055781 U | 11/2011 |

(56) References Cited

FOREIGN PATENT DOCUMENTS

| | | | |
|---|---|---|---|
| CN | 202082265 U | 12/2011 |
| CN | 202100216 U | 1/2012 |
| CN | 202100217 U | 1/2012 |
| CN | 202100815 U | 1/2012 |
| CN | 202124340 U | 1/2012 |
| CN | 202140051 U | 2/2012 |
| CN | 202140080 U | 2/2012 |
| CN | 202144789 U | 2/2012 |
| CN | 202144943 U | 2/2012 |
| CN | 202149354 U | 2/2012 |
| CN | 102383748 A | 3/2012 |
| CN | 202156297 U | 3/2012 |
| CN | 202158355 U | 3/2012 |
| CN | 202163504 U | 3/2012 |
| CN | 202165236 U | 3/2012 |
| CN | 202180866 U | 4/2012 |
| CN | 202181875 U | 4/2012 |
| CN | 202187744 U | 4/2012 |
| CN | 202191854 U | 4/2012 |
| CN | 202250008 U | 5/2012 |
| CN | 101885307 | 7/2012 |
| CN | 102562020 A | 7/2012 |
| CN | 202326156 U | 7/2012 |
| CN | 202370773 U | 8/2012 |
| CN | 202417397 U | 9/2012 |
| CN | 202417461 U | 9/2012 |
| CN | 102729335 A | 10/2012 |
| CN | 202463955 U | 10/2012 |
| CN | 202463957 U | 10/2012 |
| CN | 202467739 U | 10/2012 |
| CN | 202467801 U | 10/2012 |
| CN | 202531016 U | 11/2012 |
| CN | 202544794 U | 11/2012 |
| CN | 102825039 A | 12/2012 |
| CN | 202578592 U | 12/2012 |
| CN | 202579164 U | 12/2012 |
| CN | 202594808 U | 12/2012 |
| CN | 202594928 U | 12/2012 |
| CN | 202596615 U | 12/2012 |
| CN | 202596616 U | 12/2012 |
| CN | 102849880 A | 1/2013 |
| CN | 102889191 A | 1/2013 |
| CN | 202641535 U | 1/2013 |
| CN | 202645475 U | 1/2013 |
| CN | 202666716 U | 1/2013 |
| CN | 202669645 U | 1/2013 |
| CN | 202669944 U | 1/2013 |
| CN | 202671336 U | 1/2013 |
| CN | 202673269 U | 1/2013 |
| CN | 202751982 U | 2/2013 |
| CN | 102963629 A | 3/2013 |
| CN | 202767964 U | 3/2013 |
| CN | 202789791 U | 3/2013 |
| CN | 202789792 U | 3/2013 |
| CN | 202810717 U | 3/2013 |
| CN | 202827276 U | 3/2013 |
| CN | 202833093 U | 3/2013 |
| CN | 202833370 U | 3/2013 |
| CN | 102140898 B | 4/2013 |
| CN | 202895467 U | 4/2013 |
| CN | 202926404 U | 5/2013 |
| CN | 202935798 U | 5/2013 |
| CN | 202935816 U | 5/2013 |
| CN | 202970631 U | 6/2013 |
| CN | 103223315 A | 7/2013 |
| CN | 203050598 U | 7/2013 |
| CN | 103233714 A | 8/2013 |
| CN | 103233715 A | 8/2013 |
| CN | 103245523 A | 8/2013 |
| CN | 103247220 A | 8/2013 |
| CN | 103253839 A | 8/2013 |
| CN | 103277290 A | 9/2013 |
| CN | 103321782 A | 9/2013 |
| CN | 203170270 U | 9/2013 |
| CN | 203172509 U | 9/2013 |
| CN | 203175778 U | 9/2013 |
| CN | 203175787 U | 9/2013 |
| CN | 102849880 B | 10/2013 |
| CN | 203241231 U | 10/2013 |
| CN | 203244941 U | 10/2013 |
| CN | 203244942 U | 10/2013 |
| CN | 203303798 U | 11/2013 |
| CN | 102155172 B | 12/2013 |
| CN | 102729335 B | 12/2013 |
| CN | 103420532 A | 12/2013 |
| CN | 203321792 U | 12/2013 |
| CN | 203412658 | 1/2014 |
| CN | 203420697 U | 2/2014 |
| CN | 203480755 U | 3/2014 |
| CN | 103711437 A | 4/2014 |
| CN | 203531815 U | 4/2014 |
| CN | 203531871 U | 4/2014 |
| CN | 203531883 U | 4/2014 |
| CN | 203556164 U | 4/2014 |
| CN | 203558809 U | 4/2014 |
| CN | 203559861 U | 4/2014 |
| CN | 203559893 U | 4/2014 |
| CN | 203560189 U | 4/2014 |
| CN | 102704870 B | 5/2014 |
| CN | 203611843 U | 5/2014 |
| CN | 203612531 U | 5/2014 |
| CN | 203612843 U | 5/2014 |
| CN | 203614062 U | 5/2014 |
| CN | 203614388 U | 5/2014 |
| CN | 203621045 U | 6/2014 |
| CN | 203621046 U | 6/2014 |
| CN | 203621051 U | 6/2014 |
| CN | 203640993 U | 6/2014 |
| CN | 203655221 U | 6/2014 |
| CN | 103899280 A | 7/2014 |
| CN | 103923670 A | 7/2014 |
| CN | 203685052 U | 7/2014 |
| CN | 203716936 U | 7/2014 |
| CN | 103990410 A | 8/2014 |
| CN | 103993869 A | 8/2014 |
| CN | 203754009 U | 8/2014 |
| CN | 203754025 U | 8/2014 |
| CN | 203754341 U | 8/2014 |
| CN | 203756614 U | 8/2014 |
| CN | 203770264 U | 8/2014 |
| CN | 203784519 U | 8/2014 |
| CN | 203784520 U | 8/2014 |
| CN | 104057864 A | 9/2014 |
| CN | 203819819 U | 9/2014 |
| CN | 203823431 U | 9/2014 |
| CN | 203835337 U | 9/2014 |
| CN | 104074500 A | 10/2014 |
| CN | 203876633 U | 10/2014 |
| CN | 203876636 U | 10/2014 |
| CN | 203877364 U | 10/2014 |
| CN | 203877365 U | 10/2014 |
| CN | 203877375 U | 10/2014 |
| CN | 203877424 U | 10/2014 |
| CN | 203879476 U | 10/2014 |
| CN | 203879479 U | 10/2014 |
| CN | 203890292 U | 10/2014 |
| CN | 203899476 U | 10/2014 |
| CN | 203906206 U | 10/2014 |
| CN | 104150728 A | 11/2014 |
| CN | 104176522 A | 12/2014 |
| CN | 104196464 A | 12/2014 |
| CN | 104234651 A | 12/2014 |
| CN | 203971841 U | 12/2014 |
| CN | 203975450 U | 12/2014 |
| CN | 204020788 U | 12/2014 |
| CN | 204021980 U | 12/2014 |
| CN | 204024625 U | 12/2014 |
| CN | 204051401 U | 12/2014 |
| CN | 204060661 U | 12/2014 |
| CN | 104260672 A | 1/2015 |
| CN | 104314512 A | 1/2015 |
| CN | 204077478 U | 1/2015 |
| CN | 204077526 U | 1/2015 |
| CN | 204078307 U | 1/2015 |

(56) References Cited

FOREIGN PATENT DOCUMENTS

| | | | |
|---|---|---|---|
| CN | 204083051 U | 1/2015 |
| CN | 204113168 U | 1/2015 |
| CN | 104340682 A | 2/2015 |
| CN | 104358536 A | 2/2015 |
| CN | 104369687 A | 2/2015 |
| CN | 104402178 A | 3/2015 |
| CN | 104402185 A | 3/2015 |
| CN | 104402186 A | 3/2015 |
| CN | 204209819 U | 3/2015 |
| CN | 204224560 U | 3/2015 |
| CN | 204225813 U | 3/2015 |
| CN | 204225839 U | 3/2015 |
| CN | 104533392 A | 4/2015 |
| CN | 104563938 A | 4/2015 |
| CN | 104563994 A | 4/2015 |
| CN | 104563995 A | 4/2015 |
| CN | 104563998 A | 4/2015 |
| CN | 104564033 A | 4/2015 |
| CN | 204257122 U | 4/2015 |
| CN | 204283610 U | 4/2015 |
| CN | 204283782 U | 4/2015 |
| CN | 204297682 U | 4/2015 |
| CN | 204299810 U | 4/2015 |
| CN | 103223315 B | 5/2015 |
| CN | 104594857 A | 5/2015 |
| CN | 104595493 A | 5/2015 |
| CN | 104612647 A | 5/2015 |
| CN | 104612928 A | 5/2015 |
| CN | 104632126 A | 5/2015 |
| CN | 204325094 U | 5/2015 |
| CN | 204325098 U | 5/2015 |
| CN | 204326983 U | 5/2015 |
| CN | 204326985 U | 5/2015 |
| CN | 204344040 U | 5/2015 |
| CN | 204344095 U | 5/2015 |
| CN | 104727797 A | 6/2015 |
| CN | 204402414 U | 6/2015 |
| CN | 204402423 U | 6/2015 |
| CN | 204402450 U | 6/2015 |
| CN | 103247220 B | 7/2015 |
| CN | 104803568 A | 7/2015 |
| CN | 204436360 U | 7/2015 |
| CN | 204457524 U | 7/2015 |
| CN | 204472485 U | 7/2015 |
| CN | 204473625 U | 7/2015 |
| CN | 204477303 U | 7/2015 |
| CN | 204493095 U | 7/2015 |
| CN | 204493309 U | 7/2015 |
| CN | 103253839 B | 8/2015 |
| CN | 104820372 A | 8/2015 |
| CN | 104832093 A | 8/2015 |
| CN | 104863523 A | 8/2015 |
| CN | 204552723 U | 8/2015 |
| CN | 204553866 U | 8/2015 |
| CN | 204571831 U | 8/2015 |
| CN | 204703814 U | 10/2015 |
| CN | 204703833 U | 10/2015 |
| CN | 204703834 U | 10/2015 |
| CN | 105092401 A | 11/2015 |
| CN | 103233715 B | 12/2015 |
| CN | 103790927 | 12/2015 |
| CN | 105207097 | 12/2015 |
| CN | 204831952 U | 12/2015 |
| CN | 204899777 U | 12/2015 |
| CN | 102602323 | 1/2016 |
| CN | 105240064 A | 1/2016 |
| CN | 204944834 | 1/2016 |
| CN | 205042127 U | 2/2016 |
| CN | 205172478 U | 4/2016 |
| CN | 103993869 B | 5/2016 |
| CN | 105536299 A | 5/2016 |
| CN | 105545207 A | 5/2016 |
| CN | 205260249 | 5/2016 |
| CN | 103233714 B | 6/2016 |
| CN | 104340682 B | 6/2016 |
| CN | 205297518 U | 6/2016 |
| CN | 205298447 U | 6/2016 |
| CN | 205391821 U | 7/2016 |
| CN | 205400701 U | 7/2016 |
| CN | 103277290 B | 8/2016 |
| CN | 104260672 B | 8/2016 |
| CN | 205477370 U | 8/2016 |
| CN | 205479153 U | 8/2016 |
| CN | 205503058 U | 8/2016 |
| CN | 205503068 U | 8/2016 |
| CN | 205503089 U | 8/2016 |
| CN | 105958098 A | 9/2016 |
| CN | 205599180 | 9/2016 |
| CN | 205599180 U | 9/2016 |
| CN | 106121577 A | 11/2016 |
| CN | 205709587 | 11/2016 |
| CN | 104612928 B | 12/2016 |
| CN | 106246120 A | 12/2016 |
| CN | 205805471 | 12/2016 |
| CN | 106321045 A | 1/2017 |
| CN | 205858306 | 1/2017 |
| CN | 106438310 A | 2/2017 |
| CN | 205937833 | 2/2017 |
| CN | 104563994 B | 3/2017 |
| CN | 206129196 | 4/2017 |
| CN | 104369687 B | 5/2017 |
| CN | 106715165 | 5/2017 |
| CN | 106761561 A | 5/2017 |
| CN | 105240064 B | 6/2017 |
| CN | 206237147 | 6/2017 |
| CN | 206287832 | 6/2017 |
| CN | 206346711 | 7/2017 |
| CN | 104563995 B | 9/2017 |
| CN | 107120822 | 9/2017 |
| CN | 107143298 A | 9/2017 |
| CN | 107159046 A | 9/2017 |
| CN | 107188018 A | 9/2017 |
| CN | 206496016 | 9/2017 |
| CN | 104564033 B | 10/2017 |
| CN | 107234358 A | 10/2017 |
| CN | 107261975 A | 10/2017 |
| CN | 206581929 | 10/2017 |
| CN | 104820372 B | 12/2017 |
| CN | 105092401 B | 12/2017 |
| CN | 107476769 A | 12/2017 |
| CN | 107520526 A | 12/2017 |
| CN | 206754664 | 12/2017 |
| CN | 107605427 A | 1/2018 |
| CN | 106438310 B | 2/2018 |
| CN | 107654196 A | 2/2018 |
| CN | 107656499 A | 2/2018 |
| CN | 107728657 A | 2/2018 |
| CN | 206985503 | 2/2018 |
| CN | 207017968 | 2/2018 |
| CN | 107859053 A | 3/2018 |
| CN | 207057867 | 3/2018 |
| CN | 207085817 | 3/2018 |
| CN | 105545207 B | 4/2018 |
| CN | 107883091 A | 4/2018 |
| CN | 107902427 A | 4/2018 |
| CN | 107939290 A | 4/2018 |
| CN | 107956708 | 4/2018 |
| CN | 207169595 | 4/2018 |
| CN | 207194873 | 4/2018 |
| CN | 207245674 | 4/2018 |
| CN | 108034466 A | 5/2018 |
| CN | 108036071 A | 5/2018 |
| CN | 108087050 A | 5/2018 |
| CN | 207380566 | 5/2018 |
| CN | 108103483 A | 6/2018 |
| CN | 108179046 A | 6/2018 |
| CN | 108254276 A | 7/2018 |
| CN | 108311535 A | 7/2018 |
| CN | 207583576 | 7/2018 |
| CN | 207634064 | 7/2018 |
| CN | 207648054 | 7/2018 |
| CN | 207650621 | 7/2018 |
| CN | 108371894 A | 8/2018 |
| CN | 207777153 | 8/2018 |

(56) References Cited

FOREIGN PATENT DOCUMENTS

| | | | |
|---|---|---|---|
| CN | 108547601 A | 9/2018 |
| CN | 108547766 A | 9/2018 |
| CN | 108555826 A | 9/2018 |
| CN | 108561098 A | 9/2018 |
| CN | 108561750 A | 9/2018 |
| CN | 108590617 A | 9/2018 |
| CN | 207813495 | 9/2018 |
| CN | 207814698 | 9/2018 |
| CN | 207862275 | 9/2018 |
| CN | 108687954 A | 10/2018 |
| CN | 207935270 | 10/2018 |
| CN | 207961582 | 10/2018 |
| CN | 207964530 | 10/2018 |
| CN | 108789848 A | 11/2018 |
| CN | 108868675 A | 11/2018 |
| CN | 208086829 | 11/2018 |
| CN | 208089263 | 11/2018 |
| CN | 108979569 A | 12/2018 |
| CN | 109027662 A | 12/2018 |
| CN | 109058092 A | 12/2018 |
| CN | 208179454 | 12/2018 |
| CN | 208179502 | 12/2018 |
| CN | 208260574 | 12/2018 |
| CN | 109114418 A | 1/2019 |
| CN | 109141990 A | 1/2019 |
| CN | 208313120 | 1/2019 |
| CN | 208330319 | 1/2019 |
| CN | 208342730 | 1/2019 |
| CN | 208430982 | 1/2019 |
| CN | 208430986 | 1/2019 |
| CN | 109404274 A | 3/2019 |
| CN | 109429610 A | 3/2019 |
| CN | 109491318 A | 3/2019 |
| CN | 109515177 A | 3/2019 |
| CN | 109526523 A | 3/2019 |
| CN | 109534737 A | 3/2019 |
| CN | 208564504 | 3/2019 |
| CN | 208564516 | 3/2019 |
| CN | 208564525 | 3/2019 |
| CN | 208564918 | 3/2019 |
| CN | 208576026 | 3/2019 |
| CN | 208576042 | 3/2019 |
| CN | 208650818 | 3/2019 |
| CN | 208669244 | 3/2019 |
| CN | 109555484 A | 4/2019 |
| CN | 109682881 A | 4/2019 |
| CN | 208730959 | 4/2019 |
| CN | 208735264 | 4/2019 |
| CN | 208746733 | 4/2019 |
| CN | 208749529 | 4/2019 |
| CN | 208750405 | 4/2019 |
| CN | 208764658 | 4/2019 |
| CN | 109736740 A | 5/2019 |
| CN | 109751007 A | 5/2019 |
| CN | 208868428 | 5/2019 |
| CN | 208870761 | 5/2019 |
| CN | 109869294 A | 6/2019 |
| CN | 109882144 A | 6/2019 |
| CN | 109882372 A | 6/2019 |
| CN | 209012047 | 6/2019 |
| CN | 209100025 | 7/2019 |
| CN | 110080707 A | 8/2019 |
| CN | 110118127 A | 8/2019 |
| CN | 110124574 A | 8/2019 |
| CN | 110145277 A | 8/2019 |
| CN | 110145399 A | 8/2019 |
| CN | 110152552 A | 8/2019 |
| CN | 110155193 A | 8/2019 |
| CN | 110159225 A | 8/2019 |
| CN | 110159432 | 8/2019 |
| CN | 110159432 A | 8/2019 |
| CN | 110159433 A | 8/2019 |
| CN | 110208100 A | 9/2019 |
| CN | 110252191 A | 9/2019 |
| CN | 110284854 A | 9/2019 |
| CN | 110284972 A | 9/2019 |
| CN | 209387358 | 9/2019 |
| CN | 110374745 A | 10/2019 |
| CN | 209534736 | 10/2019 |
| CN | 110425105 A | 11/2019 |
| CN | 110439779 A | 11/2019 |
| CN | 110454285 A | 11/2019 |
| CN | 110454352 A | 11/2019 |
| CN | 110467298 A | 11/2019 |
| CN | 110469312 A | 11/2019 |
| CN | 110469314 A | 11/2019 |
| CN | 110469405 A | 11/2019 |
| CN | 110469654 A | 11/2019 |
| CN | 110485982 A | 11/2019 |
| CN | 110485983 A | 11/2019 |
| CN | 110485984 A | 11/2019 |
| CN | 110486249 A | 11/2019 |
| CN | 110500255 A | 11/2019 |
| CN | 110510771 A | 11/2019 |
| CN | 110513097 A | 11/2019 |
| CN | 209650738 | 11/2019 |
| CN | 209653968 | 11/2019 |
| CN | 209654004 | 11/2019 |
| CN | 209654022 | 11/2019 |
| CN | 209654128 | 11/2019 |
| CN | 209656622 | 11/2019 |
| CN | 107849130 B | 12/2019 |
| CN | 108087050 B | 12/2019 |
| CN | 110566173 A | 12/2019 |
| CN | 110608030 A | 12/2019 |
| CN | 110617187 A | 12/2019 |
| CN | 110617188 A | 12/2019 |
| CN | 110617318 A | 12/2019 |
| CN | 209740823 | 12/2019 |
| CN | 209780827 | 12/2019 |
| CN | 209798631 | 12/2019 |
| CN | 209799942 | 12/2019 |
| CN | 209800178 | 12/2019 |
| CN | 209855723 | 12/2019 |
| CN | 209855742 | 12/2019 |
| CN | 209875063 | 12/2019 |
| CN | 110656919 A | 1/2020 |
| CN | 107520526 B | 2/2020 |
| CN | 110787667 A | 2/2020 |
| CN | 110821464 A | 2/2020 |
| CN | 110833665 A | 2/2020 |
| CN | 110848028 A | 2/2020 |
| CN | 210049880 | 2/2020 |
| CN | 210049882 | 2/2020 |
| CN | 210097596 | 2/2020 |
| CN | 210105817 | 2/2020 |
| CN | 210105818 | 2/2020 |
| CN | 210105993 | 2/2020 |
| CN | 110873093 A | 3/2020 |
| CN | 210139911 | 3/2020 |
| CN | 110947681 A | 4/2020 |
| CN | 111058810 A | 4/2020 |
| CN | 111075391 A | 4/2020 |
| CN | 210289931 | 4/2020 |
| CN | 210289932 | 4/2020 |
| CN | 210289933 | 4/2020 |
| CN | 210303516 | 4/2020 |
| CN | 211412945 | 4/2020 |
| CN | 111089003 A | 5/2020 |
| CN | 111151186 A | 5/2020 |
| CN | 111167769 A | 5/2020 |
| CN | 111169833 A | 5/2020 |
| CN | 111173476 A | 5/2020 |
| CN | 111185460 A | 5/2020 |
| CN | 111185461 A | 5/2020 |
| CN | 111188763 A | 5/2020 |
| CN | 111206901 A | 5/2020 |
| CN | 111206992 A | 5/2020 |
| CN | 111206994 A | 5/2020 |
| CN | 210449044 | 5/2020 |
| CN | 210460875 | 5/2020 |
| CN | 210522432 | 5/2020 |
| CN | 210598943 | 5/2020 |
| CN | 210598945 | 5/2020 |

(56) References Cited

FOREIGN PATENT DOCUMENTS

| | | |
|---|---|---|
| CN | 210598946 | 5/2020 |
| CN | 210599194 | 5/2020 |
| CN | 210599303 | 5/2020 |
| CN | 210600110 | 5/2020 |
| CN | 111219326 A | 6/2020 |
| CN | 111350595 A | 6/2020 |
| CN | 210660319 | 6/2020 |
| CN | 210714569 | 6/2020 |
| CN | 210769168 | 6/2020 |
| CN | 210769169 | 6/2020 |
| CN | 210769170 | 6/2020 |
| CN | 210770133 | 6/2020 |
| CN | 210825844 | 6/2020 |
| CN | 210888904 | 6/2020 |
| CN | 210888905 | 6/2020 |
| CN | 210889242 | 6/2020 |
| CN | 111397474 A | 7/2020 |
| CN | 111412064 A | 7/2020 |
| CN | 111441923 A | 7/2020 |
| CN | 111441925 A | 7/2020 |
| CN | 111503517 A | 8/2020 |
| CN | 111515898 A | 8/2020 |
| CN | 111594059 A | 8/2020 |
| CN | 111594062 A | 8/2020 |
| CN | 111594144 A | 8/2020 |
| CN | 211201919 | 8/2020 |
| CN | 211201920 | 8/2020 |
| CN | 211202218 | 8/2020 |
| CN | 111608965 A | 9/2020 |
| CN | 111664087 A | 9/2020 |
| CN | 111677476 A | 9/2020 |
| CN | 111677647 A | 9/2020 |
| CN | 111692064 A | 9/2020 |
| CN | 111692065 A | 9/2020 |
| CN | 211384571 | 9/2020 |
| CN | 211397553 | 9/2020 |
| CN | 211397677 | 9/2020 |
| CN | 211500955 | 9/2020 |
| CN | 211524765 | 9/2020 |
| DE | 4241614 | 6/1994 |
| DE | 102012018825 | 3/2014 |
| EP | 0835983 | 4/1998 |
| EP | 1378683 | 1/2004 |
| EP | 2143916 | 1/2010 |
| EP | 2613023 | 7/2013 |
| EP | 3095989 | 11/2016 |
| EP | 3211766 | 8/2017 |
| EP | 3354866 | 8/2018 |
| EP | 3075946 | 5/2019 |
| GB | 1438172 | 6/1976 |
| JP | S57135212 | 2/1984 |
| KR | 20020026398 | 4/2002 |
| RU | 13562 | 4/2000 |
| WO | 1993020328 | 10/1993 |
| WO | 2006025886 | 3/2006 |
| WO | 2009023042 | 2/2009 |
| WO | 20110133821 | 10/2011 |
| WO | 2012139380 | 10/2012 |
| WO | 2013185399 | 12/2013 |
| WO | 2015158020 | 10/2015 |
| WO | 2016033983 | 3/2016 |
| WO | 2016078181 | 5/2016 |
| WO | 2016101374 | 6/2016 |
| WO | 2016112590 | 7/2016 |
| WO | 2017123656 A | 7/2017 |
| WO | 2017213848 | 12/2017 |
| WO | 2018031029 | 2/2018 |
| WO | 2018038710 | 3/2018 |
| WO | 2018044293 | 3/2018 |
| WO | 2018044307 | 3/2018 |
| WO | 2018071738 | 4/2018 |
| WO | 2018101909 | 6/2018 |
| WO | 2018101912 | 6/2018 |
| WO | 2018106210 | 6/2018 |
| WO | 2018106225 | 6/2018 |
| WO | 2018106252 | 6/2018 |
| WO | 2018156131 | 8/2018 |
| WO | 2018075034 | 10/2018 |
| WO | 2018187346 | 10/2018 |
| WO | 2018031031 | 2/2019 |
| WO | 2019045691 | 3/2019 |
| WO | 2019060922 | 3/2019 |
| WO | 2019126742 | 6/2019 |
| WO | 2019147601 | 8/2019 |
| WO | 2019169366 | 9/2019 |
| WO | 2019195651 | 10/2019 |
| WO | 2019200510 | 10/2019 |
| WO | 2019210417 | 11/2019 |
| WO | 2020018068 | 1/2020 |
| WO | 2020046866 | 3/2020 |
| WO | 2020072076 | 4/2020 |
| WO | 2020076569 | 4/2020 |
| WO | 2020097060 | 5/2020 |
| WO | 2020104088 | 5/2020 |
| WO | 2020131085 | 6/2020 |
| WO | 2020211083 | 10/2020 |
| WO | 2020211086 | 10/2020 |
| WO | 2021041783 | 3/2021 |

OTHER PUBLICATIONS

Filipović, Ivan, Preliminary Selection of Basic Parameters of Different Torsional Vibration Dampers Intended for use in Medium-Speed Diesel Engines, Transactions of Famena XXXVI-3 (2012).
Marine Turbine Technologies, 1 MW Power Generation Package, http://marineturbine.com/power-generation, 2017.
Business Week: Fiber-optic cables help fracking, cablinginstall. com. Jul. 12, 2013. https://www.cablinginstall.com/cable/article/16474208/businessweek-fiberoptic-cables-help-fracking.
Fracking companies switch to electric motors to power pumps, iadd-intl.org. Jun. 27, 2019. https://www.iadd-intl.org/articles/fracking-companies-switch-to-electric-motors-to-power-pumps/.
The Leader in Frac Fueling, suncoastresources.com. Jun. 29, 2015. https://web.archive.org/web/20150629220609/https://www.suncoastresources.com/oilfield/fueling-services/.
Mobile Fuel Delivery, atlasoil.com. Mar. 6, 2019. https://www.atlasoil.com/nationwide-fueling/onsite-and-mobile-fueling.
Frac Tank Hose (FRAC), 4starhose.com. Accessed: Nov. 10, 2019. http://www.4starhose.com/product/frac_tank_hose_frac.aspx.
Plos One, Dynamic Behavior of Reciprocating Plunger Pump Discharge Valve Based on Fluid Structure Interaction and Experimental Analysis. Oct. 21, 2015.
FMC Technologies, Operation and Maintenance Manual, L06 Through L16 Triplex Pumps Doc No. OMM50000903 Rev: E p. 1 of 66. Aug. 27, 2009.
Gardner Denver Hydraulic Fracturing Pumps GD 3000 https://www.gardnerdenver.com/en-us/pumps/triplex-fracking-pump-gd-3000.
Lekontsev, Yu M., et al. "Two-side sealer operation." Journal of Mining Science 49.5 (2013): 757-762.
Tom Hausfeld, GE Power & Water, and Eldon Schelske, Evolution Well Services, TM2500+ Power for Hydraulic Fracturing.
FTS International's Dual Fuel Hydraulic Fracturing Equipment Increases Operational Efficiencies, Provides Cost Benefits, Jan. 3, 2018.
CNG Delivery, Fracturing with natural gas, dual-fuel drilling with CNG, Aug. 22, 2019.
PbNG, Natural Gas Fuel for Drilling and Hydraulic Fracturing, Diesel Displacement / Dual Fuel & Bi-Fuel, May 2014.
Integrated Flow, Skid-mounted Modular Process Systems, https://ifsolutions.com/.
Cameron, A Schlumberger Company, Frac Manifold Systems, 2016.
ZSi-Foster, Energy | Solar | Fracking | Oil and Gas, https://www.zsi-foster.com/energy-solar-fracking-oil-and-gas.html.
JBG Enterprises, Inc., WS-Series Blowout Prevention Safety Coupling—Quick Release Couplings, http://www.jgbhose.com/products/WS-Series-Blowout-Prevention-Safety-Coupling.asp.
Halliburton, Vessel-based Modular Solution (VMS), 2015.
Chun, M. K., H. K. Song, and R. Lallemand. "Heavy duty gas turbines in petrochemical plants: Samsung's Daesan plant (Korea)

(56) References Cited

OTHER PUBLICATIONS beats fuel flexibility records with over 95% hydrogen in process gas." Proceedings of PowerGen Asia Conference, Singapore. 1999.
Wolf, Jurgen J., and Marko A. Perkavec. "Safety Aspects and Environmental Considerations for a 10 MW Cogeneration Heavy Duty Gas Turbine Burning Coke Oven Gas with 60% Hydrogen Content." ASME 1992 International Gas Turbine and Aeroengine Congress and Exposition. American Society of Mechanical Engineers Digital Collection, 1992.
Ginter, Timothy, and Thomas Bouvay. "Uprate options for the MS7001 heavy duty gas turbine." GE paper GER-3808C, GE Energy 12 (2006).
Chaichan, Miqdam Tariq. "The impact of equivalence ratio on performance and emissions of a hydrogen-diesel dual fuel engine with cooled exhaust gas recirculation." International Journal of Scientific & Engineering Research 6.6 (2015): 938-941.
Ecob, David J., et al. "Design and Development of a Landfill Gas Combustion System for the Typhoon Gas Turbine." ASME 1996 International Gas Turbine and Aeroengine Congress and Exhibition. American Society of Mechanical Engineers Digital Collection, 1996.
II-VI Marlow Industries, Thermoelectric Technologies in Oil, Gas, and Mining Industries, blog.marlow.com (Jul. 24, 2019).
B.M. Mahlalela, et al., Electric Power Generation Potential Based on Waste Heat and Geothermal Resources in South Africa, pangea.stanford.edu (Feb. 11, 2019).
Department of Energy, United States of America, The Water-Energy Nexus: Challenges and Opportunities purenergypolicy.org (Jun. 2014).
Ankit Tiwari, Design of a Cooling System for a Hydraulic Fracturing Equipment, The Pennsylvania State University, The Graduate School, College of Engineering, 2015.
Jp Yadav et al., Power Enhancement of Gas Turbine Plant by Intake Air Fog Cooling, Jun. 2015.
Mee Industries: Inlet Air Fogging Systems for Oil, Gas and Petrochemical Processing, Verdict Media Limited Copyright 2020.
M. Ahmadzadehtalatapeh et al.Performance enhancement of gas turbine units by retrofitting with inlet air cooling technologies (lACTs): an hour-by-hour simulation study, Journal of the Brazilian Society of Mechanical Sciences and Engineering, Mar. 2020.
Advances in Popular Torque-Link Solution Offer OEMs Greater Benefit, Jun. 21, 2018.
Emmanuel Akita et al., Mewboume College of Earth & Energy, Society of Petroleum Engineers; Drilling Systems Automation Technical Section (DSATS); 2019.
PowerShelter Kit II, nooutage.com, Sep. 6, 2019.
EMPengineering.com, HEMP Resistant Electrical Generators / Hardened Structures HEMP/GMD Shielded Generators, Virginia.
Blago Minovski, Coupled Simulations of Cooling and Engine Systems for Unsteady Analysis of the Benefits of Thermal Engine Encapsulation, Department of Applied Mechanics, Chalmers University of Technology G¨oteborg, Sweden 2015.
J. Porteiro et al., Feasibility of a new domestic CHP trigeneration with heat pump: II. Availability analysis. Design and development, Applied Thermal Engineering 24 (2004) 1421-1429.
AFGlobal Corporation, Durastim Hydraulic Fracturing Pump, A Revolutionary Design for Continuous Duty Hydraulic Fracturing, 2018.
SPM® QEM 5000 E-Frac Pump Specification Sheet, Weir Group (2019) ("Weir 5000").
Green Field Energy Services Natural Gas Driven Turbine Frac Pumps HHP Summit Presentation, Yumpu (Sep. 2012), https://www.yumpu.com/en/document/read/49685291/turbine-frac-pump-assembly-hhp ("Green Field").
Dowell B908 "Turbo-Jet" Operator's Manual.
Jereh Debut's Super power Turbine Fracturing Pump, Leading the Industrial Revolution, Jereh Oilfield Services Group (Mar. 19, 2014), https://www.prnewswire.com/news-releases/jereh-debuts-super-power-turbine-fracturing-pump-eading-the-industrial-revolution-250992111.html.
Jereh Apollo 4500 Turbine Frac Pumper Finishes Successful Field Operation in China, Jereh Group (Feb. 13, 2015), as available on Apr. 20, 2015, https://web.archive.org/web/20150420220625/https://www.prnewswire.com/news-releases/jereh-apollo-4500-turbine-frac-pumper-finishes-successful-field-operation-in-china-300035829.html.
35% Economy Increase, Dual-fuel System Highlighting Jereh Apollo Frac Pumper, Jereh Group (Apr. 13, 2015), https://www.jereh.com/en/news/press-release/news-detail-7345.htm.
Hydraulic Fracturing: Gas turbine proves successful in shale gasfield operations, Vericor (2017), https://www.vericor.com/wp-content/uploads/2020/02/7.-Fracing-4500hp-Pump-China-En.pdf ("Vericor Case Study").
Jereh Apollo Turbine Fracturing Pumper Featured on China Central Television, Jereh Group (Mar. 9, 2018), https://www.jereh.com/en/news/press-release/news-detail-7267.htm.
Jereh Unveiled New Electric Fracturing Solution at OTC 2019, Jereh Group (May 7, 2019), as available on May 28, 2019, https://web.archive.org/web/20190528183906/https://www.prnewswire.com/news-releases/jereh-unveiled-new-electric-fracturing-solution-at-otc-2019-300845028.html.
Jereh Group, Jereh Fracturing Unit, Fracturing Spread, YouTube (Mar. 30, 2015), https://www.youtube.com/watch?v=PlkDbU5dE0o.
Transcript of Jereh Group, Jereh Fracturing Unit, Fracturing Spread, YouTube (Mar. 30, 2015).
Jereh Group, Jereh Fracturing Equipment. YouTube (Jun. 8, 2015), https://www.youtube.com/watch?v =m0vMiq84P4Q.
Transcript of Jereh Group, Jereh Fracturing Equipment, YouTube (Jun. 8, 2015), https://www.youtube.com/watch?v=m0vMiq84P4Q.
Ferdinand P. Beer et al., Mechanics of Materials (6th ed. 2012).
Weir Oil & Gas Introduces Industry's First Continuous Duty 5000-Horsepower Pump, Weir Group (Jul. 25, 2019), https://www.global.weir/newsroom/news-articles/weir-oil-and-gas-introduces-industrys-first-continuous-duty-5000-horsepower-pump/.
2012 High Horsepower Summit Agenda, Natural Gas for High Horsepower Applications (Sep. 5, 2012).
Review of HHP Summit 2012, Gladstein, Neandross & Associates https://www.gladstein.org/gna-conferences/high-horsepower-summit-2012/.
Green Field Energy Services Deploys Third New Hydraulic Fracturing System, Green Field Energy Services, Inc. (Jul. 11, 2012), https://www.prnewswire.com/news-releases/green-field-energy-services-deploys-third-new-hydraulic-fracturing-spread-162113425.
Karen Boman, Turbine Technology Powers Green Field Multi-Fuel Frack Pump, Rigzone (Mar. 7, 2015), as available on Mar. 14, 2015, https://web.archive.org/web/20150314203227/https://www.rigzone.co m/news/oil-gas/a/124883/Turbine_Technology_Powers_Green_Field_ MultiFuel_Frack_Pump.
"Turbine Frac Units," WMD Squared (2012), https://wmdsquared.com/ work/gfes-turbine-frac-units/.
Leslie Turj, Green Field asset sale called 'largest disposition industry has seen,' The INDsider Media (Mar. 19, 2014), http://theind.com/article-16497-green-field-asset-sale-called-%E2%80%98largest-disposition-industry-has-seen%60.html.
American Petroleum Institute. API 674: Positive Displacement Pumps—Reciprocating. 3rd ed. Washington, DC: API Publishing Services, 2010.
American Petroleum Institute. API 616: Gas Turbines for the Petroleum, Chemical, and Gas Industry Services. 5th ed. Washington, DC: API Publishing Services, 2011.
Karassik, Igor, Joseph Messina, Paul Cooper, and Charles Heald. Pump Handbook. 4th ed. New York: McGraw-Hill Education, 2008.
Weir SPM. Weir SPM General Catalog: Well Service Pumps, Flow Control Products, Manifold Trailers, Safety Products, Post Sale Services. Ft. Worth, TX: Weir Oil & Gas. May 28, 2016. https://www.pumpfundamentals.com/pumpdatabase2/weir-spm-general.pdf.
The Weir Group, Inc. Weir SPM Pump Product Catalog. Ft. Worth, TX: S.P.M. Flow Control, Inc. Oct. 30, 2017. https://manage.global.weir/assets/files/product%20brochures/SPM_2P140706_Pump_Product_Catalogue_View.pdf.

(56) References Cited

OTHER PUBLICATIONS

Shandong Saigao Group Corporation. Q4 (5W115) Quintuplex Plunger Pump. Jinan City, Shandong Province, China: Saigao Oct. 20, 2014. https://www.saigaogroup.com/product/q400-5w115-quintuplex-plunger-pump.html.
Marine Turbine. Turbine Powered Frac Units. Franklin, Louisiana: Marine Turbine Technologies, 2020.
Rotating Right. Quintuplex Power Pump Model Q700. Edmonton, Alberta, Canada: Weatherford International Ltd. https://www.rotatingright.com/pdf/weatherford/RR%2026-Weatherford%20Model%20Q700.pdf, 2021.
CanDyne Pump Services, Inc. Weatherford Q700 Pump. Calgary, Alberta, Canada: CanDyne Pump Services. Aug. 15, 2015. http://candyne.com/wp-content/uploads/2014/10/181905-94921.q700-quintuplex-pump.pdf.
Arop, Julius Bankong. Geomechanical review of hydraulic fracturing technology. Thesis (M. Eng.). Cambridge, MA: Massachusetts Institute of Technology, Dept. of Civil and Environmental Engineering. Oct. 29, 2013. https://dspace.mit.edu/handle/1721.1/82176.
Europump and Hydrualic Institute, Variable Speed Pumping: A Guide to Successful Applications, Elsevier Ltd, 2004.
Capstone Turbine Corporation, Capstone Receives Three Megawatt Order from Large Independent Oil & Gas Company in Eagle Ford Shale Play, Dec. 7, 2010.
Wikipedia, Westinghouse Combustion Turbine Systems Division, https://en.wikipedia.org/wiki/Westinghouse_Combustion_Turbine_Systems_Division, circa 1960.
Wikipedia,Union Pacific GTELs, https://en.wikipedia.org/wiki/Union_Pacific_GTELs, circa 1950.
HCI JET Frac, Screenshots from YouTube, Dec. 11, 2010. https://www.youtube.com/watch?v=6HjXkdbFaFQ.
AFD Petroleum Ltd., Automated Hot Zone, Frac Refueling System, Dec. 2018.
Eygun, Christiane, et al., URTeC: 2687987, Mitigating Shale Gas Developments Carbon Footprint: Evaluating and Implementing Solutions in Argentina, Copyright 2017, Unconventional Resources Technology Conference.
Walzel, Brian, Hart Energy, Oil, Gas Industry Discovers Innovative Solutions to Environmental Concerns, Dec. 10, 2018.
Frac Shack, Bi-Fuel FracFueller brochure, 2011.
Pettigrew, Dana, et al., High Pressure Multi-Stage Centrifugal Pump for 10,000 psi Frac Pump—HPHPS FRAC Pump, Copyright 2013, Society of Petroleum Engineers, SPE 166191.
Elle Seybold, et al., Evolution of Dual Fuel Pressure Pumping for Fracturing: Methods, Economics, Field Trial Results and Improvements in Availability of Fuel, Copyright 2013, Society of Petroleum Engineers, SPE 166443.
Wallace, E.M., Associated Shale Gas: From Flares to Rig Power, Copyright 2015, Society of Petroleum Engineers, SPE-173491-MS.
Williams, C.W. (Gulf Oil Corp. Odessa Texas), The Use of Gas-turbine Engines in an Automated High-Pressure Water-injection Stations; American Petroleum Institute; API-63-144 (Jan. 1, 1963).
Neal, J.C. (Gulf Oil Corp. Odessa Texas), Gas Turbine Driven Centrifugal Pumps for High Pressure Water Injection; American Institute of Mining, Metallurgical and Petroleum Engineers, Inc.; SPE-1888 (1967).
Porter, John A. (Solar Division International Harvester Co.), Modem Industrial Gas Turbines for the Oil Field; American Petroleum Institute; Drilling and Production Practice; API-67-243 (Jan. 1, 1967).
Cooper et al., Jet Frac Porta-Skid—A New Concept in Oil Field Service Pump Equipments[sic]; Halliburton Services; SPE-2706 (1969).
Ibragimov, É.S., Use of gas-turbine engines in oil field pumping units; Chem Petrol Eng; (1994) 30: 530. https://doi.brg/10.1007/BF01154919. (Translated from Khimicheskaya i Neftyanoe Mashinostroenie, No. 11, pp. 24-26, (Nov. 1994.).
Kas yanov et al., Application of gas-turbine engines in pumping units complexes of hydraulic fracturing of oil and gas Yeservoirs; Exposition Oil & Gas; (Oct. 2012) (published in Russian).
ISM, What is Cracking Pressure, 2019.
Swagelok, The right valve for controlling flow direction? Check, 2016.
Technology.org, Check valves how do they work and what are the main type, 2018.

\* cited by examiner

BI-FUEL RECIPROCATING ENGINE TO POWER DIRECT DRIVE TURBINE FRACTURING PUMPS ONBOARD AUXILIARY SYSTEMS AND RELATED METHODS

PRIORITY CLAIM

This U.S. Non-Provisional patent application claims priority to and the benefit of, under 35 U.S.C. § 119(e), U.S. Provisional Application No. 62/705,188, filed Jun. 15, 2020, titled "BI-FUEL RECIPROCATING ENGINE TO POWER ONBOARD FRACTURING PUMP AUXILIARY SYSTEMS AND RELATED METHODS," and U.S. Provisional Application No. 62/704,774, filed May 28, 2020, titled "SYSTEMS AND METHODS FOR SUPPLYING PRIMARY FUEL AND SECONDARY FUEL TO AN INTERNAL COMBUSTION ENGINE OF A FRACTURING UNIT," the disclosures of both of which are incorporated herein by reference in their entirety.

TECHNICAL FIELD

The present disclosure relates to systems and methods for supplying fuel to an internal combustion engine of a fracturing unit and, more particularly, to systems and methods for supplying a primary fuel and a secondary fuel for operation of an internal combustion engine associated with a hydraulic fracturing unit.

BACKGROUND

Fracturing is an oilfield operation that stimulates production of hydrocarbons, such that the hydrocarbons may more easily or readily flow from a subsurface formation to a well. For example, a fracturing system may be configured to fracture a formation by pumping a fracturing fluid into a well at high pressure and high flow rates. Some fracturing fluids may take the form of a slurry including water, proppants, and/or other additives, such as thickening agents and/or gels. The slurry may be forced via one or more pumps into the formation at rates faster than can be accepted by the existing pores, fractures, faults, or other spaces within the formation. As a result, pressure builds rapidly to the point where the formation may fail and may begin to fracture. By continuing to pump the fracturing fluid into the formation, existing fractures in the formation are caused to expand and extend in directions farther away from a well bore, thereby creating flow paths to the well bore. The proppants may serve to prevent the expanded fractures from closing when pumping of the fracturing fluid is ceased or may reduce the extent to which the expanded fractures contract when pumping of the fracturing fluid is ceased. Once the formation is fractured, large quantities of the injected fracturing fluid are allowed to flow out of the well, and the production stream of hydrocarbons may be obtained from the formation.

Prime movers may be used to supply power to a plurality of fracturing pumps for pumping the fracturing fluid into the formation. For example, a plurality of gas turbine engines may each be mechanically connected to a corresponding fracturing pump and may be operated to drive the corresponding fracturing pump. A fracturing unit may include a gas turbine engine or other type of prime mover and a corresponding fracturing pump, as well as auxiliary components for operating and controlling the fracturing unit, including electrical, pneumatic, and/or hydraulic components. The gas turbine engine, fracturing pump, and auxiliary components may be connected to a common platform or trailer for transportation and set-up as a fracturing unit at the site of a fracturing operation, which may include up to a dozen or more of such fracturing units operating together to perform the fracturing operation. In order to supply electrical, pneumatic, and/or hydraulic power for operation of the auxiliary components, an additional prime mover may be used. For example, another internal combustion engine may be used and may have a relatively reduced rated output as compared to the prime mover used for driving the fracturing pump. However, the additional prime mover may have different fuel requirements, which may be costly and/or may be prone to producing significant additional undesirable emissions. Thus, the additional internal combustion engine may increase costs and result in higher emissions than desired.

Accordingly, Applicant has recognized a need for systems and methods that provide greater efficiency and/or reduced emissions when performing a fracturing operation. The present disclosure may address one or more of the above-referenced drawbacks, as well as other possible drawbacks.

SUMMARY

The present disclosure generally is directed to systems and methods for supplying fuel to an internal combustion engine associated with a hydraulic fracturing system. For example, in some embodiments, a system to supply primary fuel and secondary fuel to operate an internal combustion engine may include a first manifold positioned to provide fluid flow from a primary fuel source of primary fuel to an internal combustion engine. The system also may include a primary valve associated with the first manifold and positioned to provide fluid flow between the primary fuel source and the internal combustion engine. The system further may include a second manifold positioned to provide fluid flow from a secondary fuel supply of secondary fuel to the internal combustion engine. The system still also may include one or more of a fuel pump or a secondary valve associated with the second manifold and positioned to provide fluid flow between the secondary fuel source and the internal combustion engine. The system still further may include a controller in communication with one or more of the primary valve, the fuel pump, or the secondary valve and may be configured to receive one or more signals indicative of one or more of a hydraulic power load on the internal combustion engine or an electric power load on the internal combustion engine. The controller also may be configured to determine, based at least in part on the one or more signals, a total power load on the internal combustion engine, and determine, based at least in part on the total power load, a first amount of primary fuel to supply to the internal combustion engine and a second amount of secondary fuel to supply to the internal combustion engine. The controller further may be configured to cause, based at least in part on the first amount and the second amount, one or more of the primary valve, the fuel pump, or the secondary valve to operate to supply the first amount of primary fuel and the second amount of secondary fuel to the internal combustion engine.

According to some embodiments, a fracturing unit may include a chassis and a fracturing pump connected to the chassis and positioned to pump a fracturing fluid. The fracturing unit also may include a gas turbine engine connected to the chassis and positioned to convert fuel into a power output for operating the fracturing pump. The fracturing unit further may include a reciprocating-piston engine connected to the chassis and positioned to supply power to operate one or more of hydraulic auxiliary components or electrical auxiliary components associated with the fracturing unit. The fracturing unit also may include a first manifold positioned to provide fluid flow from a primary fuel source of primary fuel to the gas turbine engine and the reciprocating-piston engine. The fracturing unit still may include a second manifold positioned to provide fluid flow from a secondary fuel supply of secondary fuel to the reciprocating-piston engine. The fracturing unit additionally may include a controller configured to receive one or more signals indicative of operation of one or more of the hydraulic auxiliary components or the electrical auxiliary components, and determine, based at least in part on the one or more signals, a first amount of primary fuel to supply to the reciprocating-piston engine and a second amount of secondary fuel to supply to the reciprocating-piston engine. The controller also may be configured to cause, based at least in part on the first amount and the second amount, supply of the first amount of primary fuel and the second amount of secondary fuel to the reciprocating-piston engine.

According to some embodiments, a method for supplying primary fuel and secondary fuel to a reciprocating-piston engine may include determining a total power load on the reciprocating-piston engine due to operation of one or more of hydraulic auxiliary components supplied with power by the reciprocating-piston engine or electrical auxiliary components supplied with power by the reciprocating-piston engine. The method further may include determining, based at least in part on the total power load, a first amount of primary fuel to supply to the reciprocating-piston engine and a second amount of secondary fuel to supply to the reciprocating-piston engine. The method further may include causing, based at least in part on the first amount and the second amount, one or more of: a primary valve to operate to supply the first amount of primary fuel to the reciprocating-piston engine, or one or more of a fuel pump or a secondary valve to operate to supply the second amount of secondary fuel to the reciprocating-piston engine.

Still other aspects and advantages of these exemplary embodiments and other embodiments, are discussed in detail herein. Moreover, it is to be understood that both the foregoing information and the following detailed description provide merely illustrative examples of various aspects and embodiments, and are intended to provide an overview or framework for understanding the nature and character of the claimed aspects and embodiments. Accordingly, these and other objects, along with advantages and features of the present invention herein disclosed, will become apparent through reference to the following description and the accompanying drawings. Furthermore, it is to be understood that the features of the various embodiments described herein are not mutually exclusive and may exist in various combinations and permutations.

BRIEF DESCRIPTION OF THE DRAWINGS

The accompanying drawings, which are included to provide a further understanding of the embodiments of the present disclosure, are incorporated in and constitute a part of this specification, illustrate embodiments of the present disclosure, and together with the detailed description, serve to explain principles of the embodiments discussed herein. No attempt is made to show structural details of this disclosure in more detail than can be necessary for a fundamental understanding of the embodiments discussed herein and the various ways in which they can be practiced. According to common practice, the various features of the drawings discussed below are not necessarily drawn to scale. Dimensions of various features and elements in the drawings can be expanded or reduced to more clearly illustrate embodiments of the disclosure.

DETAILED DESCRIPTION

The drawings include like numerals to indicate like parts throughout the several views, the following description is provided as an enabling teaching of exemplary embodiments, and those skilled in the relevant art will recognize that many changes may be made to the embodiments described. It also will be apparent that some of the desired benefits of the embodiments described can be obtained by selecting some of the features of the embodiments without utilizing other features. Accordingly, those skilled in the art will recognize that many modifications and adaptations to the embodiments described are possible and may even be desirable in certain circumstances. Thus, the following description is provided as illustrative of the principles of the embodiments and not in limitation thereof.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to," unless otherwise stated. Thus, the use of such terms is meant to encompass the items listed thereafter, and equivalents thereof, as well as additional items. The transitional phrases "consisting of" and "consisting essentially of," are closed or semi-closed transitional phrases, respectively, with respect to any claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish claim elements.

Figure 1:
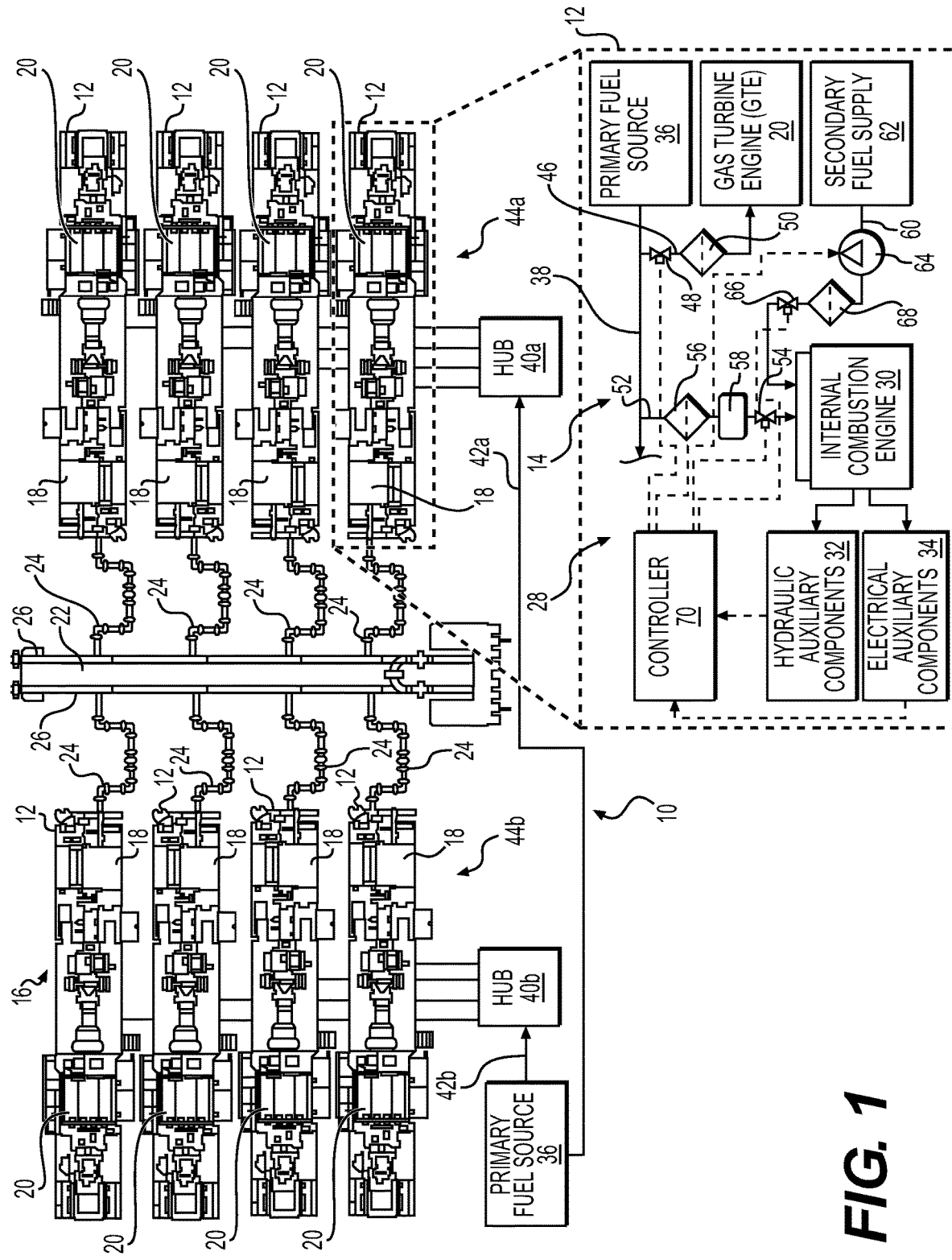
FIG. 1 schematically illustrates an example fracturing system including a plurality of hydraulic fracturing units, including a detailed schematic view of an example system for supplying primary fuel and secondary fuel to an example internal combustion engine according to an embodiment of the disclosure.

FIG. 1 schematically illustrates an example fuel delivery system 10 for supplying fuel to a plurality of hydraulic fracturing units 12, including a detailed schematic view of an example fuel line connection assembly 14 according to embodiments of the disclosure. The fuel delivery system 10 may be part of a hydraulic fracturing system 16 that includes a plurality (or fleet) of hydraulic fracturing units 12 configured to pump a fracturing fluid into a well at high pressure and high flow rates, so that a subterranean formation fails and begins to fracture in order to promote hydrocarbon production from the well.

In some examples, one or more of the hydraulic fracturing units 12 may include directly driven turbine (DDT) pumping units, in which fracturing pumps 18 are connected to one or more gas turbine engines (GTEs) 20 that supply power to the respective fracturing pump 18 for supplying fracturing fluid at high pressure and high flow rates to a formation. For example, a GTE 20 may be connected to a respective fracturing pump 18 via a reduction transmission connected to a drive shaft, which, in turn, is connected to an input shaft or input flange of a respective fracturing pump 18, which may be a reciprocating pump. Other types of GTE-to-fracturing pump arrangements are contemplated.

In some examples, one or more of the GTEs 20 may be a dual-fuel or bi-fuel GTE, for example, capable of being operated using of two or more different types of fuel, such as a gaseous fuel, for example, natural gas, and a fluid fuel, for example, diesel fuel, although other types of fuel are contemplated. For example, a dual-fuel or bi-fuel GTE may be capable of being operated using a first type of fuel, a second type of fuel, and/or a combination of the first type of fuel and the second type of fuel. For example, the fuel may include compressed natural gas (CNG), natural gas, field gas, pipeline gas, methane, propane, butane, and/or liquid fuels, such as, for example, diesel fuel (e.g., #2 Diesel), bio-diesel fuel, bio-fuel, alcohol, gasoline, gasohol, aviation fuel, and other fuels as will be understood by those skilled in the art. Gaseous fuels may be supplied by CNG bulk vessels, a gas compressor, a liquid natural gas vaporizer, line gas, and/or well-gas produced natural gas. Other types and sources of fuel and associated fuel supply sources are contemplated. The one or more GTEs 20 may be operated to provide horsepower to drive via a transmission one or more of the fracturing pumps 18 to safely and successfully fracture a formation during a well stimulation project or fracturing operation. Types of prime movers other than GTEs also are contemplated.

Although not shown in FIG. 1, as will be understood by those skilled in the art, the hydraulic fracturing system 16 may include a plurality of water tanks for supplying water for a fracturing fluid, one or more chemical tanks for supplying gels or agents for adding to the fracturing fluid, and a plurality of proppant tanks (e.g., sand tanks) for supplying proppants for the fracturing fluid. The hydraulic fracturing system 16 may also include a hydration unit for mixing water from the water tanks and gels and/or agents from the chemical tank to form a mixture, for example, gelled water. The hydraulic fracturing system 16 may also include a blender, which may receive the mixture from the hydration unit and proppants via conveyers from the proppant tanks. The blender may mix the mixture and the proppants into a slurry to serve as fracturing fluid for the hydraulic fracturing system 16. Once combined, the slurry may be discharged through low-pressure hoses, which convey the slurry into two or more low-pressure lines in a frac manifold 22, as shown in FIG. 1. Low-pressure lines in the frac manifold 22 feed the slurry to the plurality of fracturing pumps 18 shown in FIG. 1 through low-pressure suction hoses.

FIG. 1 shows an example fuel delivery system 10 associated with a plurality, or fleet, of example hydraulic fracturing units 12 according to embodiments of the disclosure, although fewer or more hydraulic fracturing units 12 are contemplated. In the example shown, each of the plurality of hydraulic fracturing units 12 includes a GTE 20. Each of the GTEs 20 supplies power for each of the hydraulic fracturing units 12 to operate a respective fracturing pump 18.

The fracturing pumps 18 are driven by the GTEs 20 of the respective hydraulic fracturing units 12 and discharge the slurry (e.g., the fracturing fluid including the water, agents, gels, and/or proppants) at high pressure and/or a high flow rates through individual high-pressure discharge lines 24 into two or more high-pressure flow lines 26, sometimes referred to as "missiles," on the frac manifold 22. The flow from the flow lines 26 is combined at the frac manifold 22, and one or more of the flow lines 26 provide flow communication with a manifold assembly, sometimes referred to as a "goat head." The manifold assembly delivers the slurry into a wellhead manifold, sometimes referred to as a "zipper manifold" or a "frac manifold." The wellhead manifold may be configured to selectively divert the slurry to, for example, one or more well heads via operation of one or more valves. Once the fracturing process is ceased or completed, flow returning from the fractured formation discharges into a flowback manifold, and the returned flow may be collected in one or more flowback tanks.

As shown in the detailed schematic view of an example system 28 for supplying primary fuel and secondary fuel to an example internal combustion engine 30 according to embodiments of the disclosure, one or more of the hydraulic fracturing units 12 also may include hydraulic auxiliary components 32 and electrical auxiliary components 34 for operating auxiliary components of the respective hydraulic fracturing unit 12, which may facilitate operation of the hydraulic fracturing unit 12. For example, the hydraulic auxiliary components 32 may be configured to supply hydraulic power for operation of hydraulic circuits on-board the hydraulic fracturing unit 12, as will be understood by those skilled in the art, including, for example, a hydraulic fluid reservoir, one or more hydraulic pumps for providing the hydraulic circuits with power, one or more flow control valves, metering valves, or check valves, and/or one or more hydraulic actuators, such as hydraulic motors and hydraulic cylinders for preforming functions associated with operation of the hydraulic fracturing unit 12. The electrical auxiliary components 34 may include one or more electrical power sources to provide electrical power for operation of electrical circuits (e.g., an electrical power generation device, batteries, solar panels, etc.), component controllers, instrumentation, sensors, and/or one or more electric actuators, such as electric motors and linear actuators, as will be understood by those skilled in the art. Other hydraulic and/or electrical components are contemplated.

In the example shown in FIG. 1, one or more of the components of the hydraulic fracturing system 16 may be configured to be portable, so that the hydraulic fracturing system 16 may be transported to a well site, assembled, operated for a relatively short period of time, at least partially disassembled, and transported to another location of another well site for use. Each of the fracturing pumps 18 and GTEs 20 of a respective hydraulic fracturing unit 12 may be connected to (e.g., mounted on) a chassis. In some examples, the chassis may include a platform or trailer (e.g., a flat-bed trailer) and/or a truck body to which the components of a respective hydraulic fracturing unit 12 may be connected. For example, the components may be carried by trailers and/or incorporated into trucks, so that they may be easily transported between well sites.

As shown in FIG. 1, the example fuel delivery system 10 may include a plurality of fuel line connection assemblies 14, for example, for facilitating the supply of primary fuel from a primary fuel source 36 to each of the GTEs 20 of the hydraulic fracturing system 16. In some embodiments, for example, as shown in FIG. 1, one or more of the fuel line connection assemblies 14 may include a manifold line 38 providing fluid flow between the primary fuel source 36 and the respective hydraulic fracturing units 12.

In the example shown in FIG. 1, the fuel delivery system 10 includes two hubs 40*a* and 40*b* (e.g., fuel hubs). A first one 40*a* of the hubs 40*a*, 40*b* is connected to the primary fuel source 36 via a first fuel line 42*a*, and a second hub 40*b* is connected to the primary fuel source 36 via a second fuel line 42*b*. The first hub 40*a* may supply primary fuel to one or more (e.g., each) of the GTEs 20 of a first bank 44*a* of hydraulic fracturing units 12, and the second hub 40*b* may supply primary fuel to one or more (e.g., each) of the GTEs 20 of a second bank 44*b* of hydraulic fracturing units 12. Fewer (zero or one), or more, than two hubs are contemplated.

For example, as shown in FIG. 1, the fuel delivery system 10 may include a fuel line connection assembly 14 associated with each of the hydraulic fracturing units 12. In the example configuration shown in FIG. 1, each of the hydraulic fracturing units 12 of the first bank 44*a* may be in fluid communication with the primary fuel source 36 via the first fuel line 42*a*, the first hub 44*a*, and a respective one of the manifold lines 38 providing fluid flow between the first hub 40*a* and each of the respective hydraulic fracturing units 12.

As shown in the detailed schematic view in FIG. 1 of the example system 28 for supplying primary fuel and secondary fuel to an example internal combustion engine 30, a fuel distribution line 46 may be connected to the manifold line 38 to provide fluid flow between the manifold line 38 and the GTE 20. In some examples, a fuel valve 48 may be provided in the fuel distribution line 46 to control the flow of primary fuel to the GTE 20. In some examples, the system 28 may also include a filter 50 disposed in the fuel distribution line 46 between the manifold line 36 and the GTE 20 and configured to filter one or more of particulates or liquids from primary fuel flowing to the GTE 20. In some examples, the filter 50 may include a first filter configured to remove particulates from primary fuel supplied to the GTE 20 and a second filter (e.g., a coalescing filter) configured to remove liquids from the fuel distribution line 46 before primary fuel reaches the GTE 20. This may improve performance of the GTE 20 and/or reduce maintenance and/or damage to the GTE 20 due to contaminants in the fuel as will be understood by those skilled in the art.

The example system 28 shown in FIG. 1 also includes a first manifold 52 positioned to provide fluid flow from the primary fuel source 36 of primary fuel to the internal combustion engine 30. In some examples, and as shown in FIG. 1, the internal combustion engine 30 may be connected to the hydraulic auxiliary components 32 and/or the electrical auxiliary components 34 to supply mechanical power to operate the hydraulic auxiliary components 32 and/or the electrical auxiliary components 34, as explained in more detail herein with respect to FIG. 2.

As shown in FIG. 1, a primary valve 54 may be provided in the first manifold 52 and may be configured to control the flow of primary fuel from the primary fuel source 36 to the internal combustion engine 30. The system 28 also may include a filter 56 disposed in the first manifold 52 between the manifold line 36 and the internal combustion engine 30 and configured to filter one or more of particulates or liquids from primary fuel flowing to the internal combustion engine 30. In some examples, the filter 56 may include a first filter configured to remove particulates from primary fuel and a second filter (e.g., a coalescing filter) configured to remove liquids from the first manifold 52 before primary fuel reaches the internal combustion engine 30. This may improve performance of the internal combustion engine 30 and/or reduce maintenance and/or damage to the internal combustion engine 30 due to contaminants in the fuel, for example. In some embodiments, the system 28 for supplying primary fuel and secondary fuel also may include a pressure regulator 58 disposed in the first manifold 52 between, for example, the filter 56 and the primary valve 54 and configured to control pressure of the primary fuel in the first manifold 52. As explained in more detail herein with respect to FIG. 2, this example arrangement may facilitate operation of the internal combustion engine 30 using the primary fuel from the primary fuel source 36 shared with the GTE 20 for operation.

As shown in FIG.1, the example system 28 shown also includes a second manifold 60 positioned to provide fluid flow from a secondary fuel supply 62 of secondary fuel to the internal combustion engine 30. For example, the system 28 also may include a fuel pump 64 configured to draw and/or pump secondary fuel from the secondary fuel supply 62 through the second manifold 60 to the internal combustion engine 30. Some embodiments also may include a secondary valve 66 disposed in the secondary manifold 60 configured to control the flow of secondary fuel from the secondary fuel supply 62 to the internal combustion engine 30. The system 28 also may include a filter 68 disposed in the second manifold 60 between the fuel pump 64 and the secondary valve 66 and configured to filter one or more of particulates or liquids from secondary fuel flowing to the internal combustion engine 30. In some embodiments, the filter 68 may include a first filter configured to remove particulates from secondary fuel and a second filter (e.g., a coalescing filter) configured to remove liquids from the second manifold 60 before secondary fuel reaches the internal combustion engine 30. This may improve performance of the internal combustion engine 30 and/or reduce maintenance and/or damage to the internal combustion engine 30 due to contaminants in the fuel as will be understood by those skilled in the art.

As shown in FIG. 1, the system 28, in some embodiments, still also may include a controller 70 in communication with the primary valve 54, the fuel pump 64, and/or the secondary valve 66 and configured to control the flow of primary fuel from the primary fuel source 36 and secondary fuel from the secondary fuel supply 62 to the internal combustion engine 30. For example, the controller 70 may be configured to receive one or more signals indicative of a hydraulic power load on the internal combustion engine 30 and/or an electric power load on the internal combustion engine 30. In some examples, the one or more signals indicative of operation of the hydraulic auxiliary components 32 may include one or more signals generated by one or more sensors associated with the hydraulic auxiliary components 32. In some examples, the one or more signals indicative of operation of the electrical auxiliary components 34 may include one or more signals generated by one or more sensors associated with the electrical auxiliary components 34. For example, operation of the hydraulic auxiliary components 32, supplied with power by the internal combustion engine 30, and/or operation of the electrical auxiliary components 34, supplied with power by the internal combustion engine 30, generate a power load on the internal combustion engine 30, and the internal combustion engine 30 responds to changes in the power load to meet the power demands of the hydraulic auxiliary components 32 and/or the electrical auxiliary components 34.

In some examples, the controller 70 may determine a total power load on the internal combustion engine 30, for example, based at least in part on the one or more signals indicative of the hydraulic power load on the internal combustion engine 30 and/or the electric power load on the internal combustion engine 30. Based at least in part on the total power load, the controller 70 may also determine a first amount of primary fuel to supply to the internal combustion engine 30 and a second amount of secondary fuel to supply to the internal combustion engine 30. Based at least in part on this determination of the total power load, the controller 70 may be configured to cause the primary valve 54, associated with the flow of primary fuel to the internal combustion engine 30, the fuel pump 64, and/or the secondary valve 66, associated with the flow of secondary fuel to the internal combustion engine 30, to operate to supply the first amount of primary fuel and the second amount of secondary fuel to the internal combustion engine 30.

In this example manner, the system 28 may provide fuel for operation from two (or more) different fuel sources to the internal combustion engine 30 for operation. In some examples, the primary fuel may be a gaseous fuel, such as, for example, compressed natural gas (CNG), natural gas, field gas, pipeline gas, methane, propane, and/or butane as will be understood by those skilled in the art. Gaseous fuels may be supplied by CNG bulk vessels, a gas compressor, a liquid natural gas vaporizer, line gas, and/or well-gas produced natural gas. In some examples, the primary fuel may be provided by the primary fuel source 36, which, in some examples, is the same source of the primary fuel supplied to the GTE 20. The secondary fuel, in some examples, may be a liquid fuel, such as, for example, diesel fuel (e.g., #2 Diesel), bio-diesel fuel, bio-fuel, alcohol, gasoline, gasohol, aviation fuel, and other fuels as will be understood by those skilled in the art. The secondary fuel may be supplied by the secondary fuel supply 62, which may be a fuel tank associated with the hydraulic fracturing unit 12 to which the internal combustion engine 30 is connected.

Thus, in some examples, the system 28 may be configured to supply both gaseous fuel and liquid fuel to the internal combustion engine 30 for operation. Some examples of the internal combustion engine 30 may be a reciprocating-piston diesel engine, or reciprocating-piston compression-ignition engine, which may be configured to operate using the primary fuel (e.g., natural gas), the secondary fuel (e.g., diesel fuel), or a combination of the primary fuel and secondary fuel. In some examples, operation of the internal combustion engine 30 using primary fuel that includes, or is limited to, natural gas may be relatively more cost-effective and/or may result in relatively reduced emissions as compared to operation of the internal combustion engine 30 using secondary fuel that includes, or is limited to, diesel fuel. Thus, during operation in which the internal combustion engine 30 is able to supply a sufficient amount of power using solely the primary fuel (e.g., natural gas) supplied by the primary fuel source 36 to meet the power demands of the hydraulic auxiliary components 32 and/or the electrical auxiliary components 34, the system 28 may operate the internal combustion engine 30 using solely the primary fuel supplied by the primary fuel source 36, for example, to increase efficiencies and/or reduce emissions associated with operation of the internal combustion engine 30.

In some such examples of the internal combustion engine 30, operation using solely the primary fuel (e.g., natural gas) may result in a relatively reduced maximum power output as compared to operation of the internal combustion engine 30 using the secondary fuel (e.g., diesel fuel). Thus, for operational situations in which operation of the internal combustion engine 30 using solely the primary fuel supplied by the primary fuel source 36 would not result in supplying enough power to the hydraulic auxiliary components 32 and/or the electrical auxiliary components 34 to meet the power demands of the hydraulic auxiliary components 32 and/or the electrical auxiliary components 34, the system 28 may be configured to substitute secondary fuel (e.g., diesel fuel) supplied by the secondary fuel supply 62 for at least a portion of the primary fuel (e.g., natural gas) to meet the demands of the hydraulic auxiliary components 32 and/or the electrical auxiliary components 34, for example, as explained in more detail herein. In some operational situations, the system 28 may be configured to operate the internal combustion engine 30 using solely secondary fuel supplied by the secondary fuel supply 62, for example, to achieve a maximum power output of the internal combustion engine 30.

Although not shown in FIG. 1, in some embodiments, the GTE 20 may also be configured to operate using two or more different types of fuel. For example, in addition to being configured to operate using primary fuel supplied by the primary fuel source 36 (e.g., natural gas), some examples of the GTE 20 may also be configured to operate using the secondary fuel (e.g., diesel fuel) supplied by the secondary fuel supply 62, or a combination of the primary fuel and secondary fuel. The secondary fuel supply 62 may be a fuel tank connected to the hydraulic fracturing unit 12 and/or an auxiliary fuel tank or tanker configured to be in flow communication with the hydraulic fracturing unit 12, the GTE 20, and the internal combustion engine 30. Thus, in some examples, as shown, the GTE 20 and the internal combustion engine 30 may share primary fuel supplied by the primary fuel source 36 with the GTE 20 and/or may share secondary fuel supplied by the secondary fuel supply 62 with the GTE 20. Other types and sources of fuel are contemplated.

In some embodiments, the controller 70 may be configured to cause the first amount of primary fuel to decrease relative to the second amount of secondary fuel as the total power load on the internal combustion 30 increases. Because, in some examples, the secondary fuel supplied by the secondary fuel supply 62 may provide relatively more energy per unit mass or volume than the primary fuel supplied by the primary fuel source 36, as the load increases on the internal combustion engine, the controller 70 may increase the ratio of secondary fuel to primary fuel supplied to the internal combustion engine 30 to meet the increasing power load demand.

The controller 70 may, in some examples, may be configured to determine the first amount or primary fuel and the second amount of secondary fuel based at least in part on an efficiency of the primary fuel (e.g., an energy efficiency and/or a financial efficiency associated with the primary fuel) relative to an efficiency of the secondary fuel (e.g., an energy efficiency and/or a financial efficiency associated with the secondary fuel). For example, for operational situations in which operation of the internal combustion engine 30 using a combination of primary fuel and secondary fuel will provide a power output sufficient to meet the combined power demands from the hydraulic auxiliary components 32 and/or the electrical auxiliary components 34, the controller 70 may be configured to determine the first amount of primary fuel and the second amount of secondary fuel that meets the power demands with the highest efficiency.

In some examples, the controller 70 may be configured to determine the amount of primary fuel and the amount of secondary fuel for operation based at least in part on efficiency data accessed from a table stored in memory correlating the efficiency of the primary fuel, the efficiency of the secondary fuel, and/or the power output of the internal combustion engine 30 operating using the primary fuel and the secondary fuel. For example, such correlations may be based on calculations according to theoretical, mathematical, and/or scientific determinations as a function of the efficiency of the primary fuel, the efficiency of the secondary fuel, and/or the power output of the internal combustion engine 30 based on the combination of primary fuel and secondary fuel (e.g., a ratio of the amount of the primary fuel to the amount of the secondary fuel). In some examples, such correlations may be empirically-derived and/or estimated based at least in part on historical operation, testing, and/or simulated operation of the internal combustion engine 30.

In some embodiments, the controller 70 may be configured to determine the first amount of primary fuel and the second amount of the secondary fuel for operation of the internal combustion engine 30, based at least in part on one or more formulas relating the efficiency of the primary fuel, the efficiency of the secondary fuel, and/or the power output of the internal combustion engine using the primary fuel and the secondary fuel. For example, such formulas may be derived according to theoretical, mathematical, and/or scientific determinations relating the efficiency of the primary fuel, the efficiency of the secondary fuel, and/or the power output of the internal combustion engine 30 based on the combination of primary fuel and secondary fuel (e.g., a ratio of the amount of the primary fuel to the amount of the secondary fuel). In some examples, such formulas may be empirically-derived and/or estimated based at least in part on historical operation, testing, and/or simulated operation of the internal combustion engine 30. During operation according to some examples, the amounts of primary and/or secondary fuel may be determined real-time, during operation of the internal combustion engine 30, for example, depending on the total power demand for operation of the hydraulic auxiliary components 32 and/or the electrical auxiliary components 34.

According to some embodiments, the controller 70 may be configured to determine first expected emissions generated during operation of the internal combustion engine 30 using the first amount of primary fuel and/or second expected emissions generated during operation of the internal combustion engine 30 using the second amount of secondary fuel. For example, emissions generated by operation of the internal combustion engine 30 using the primary fuel may differ from emissions generated by operation of the internal combustion engine 30 using secondary fuel. Thus, in some examples, the controller 70 may be configured to estimate or determine first expected emissions generated during operation of the internal combustion engine 30 using the first amount of primary fuel and/or second expected emissions generated during operation of the internal combustion engine 30 using the second amount of secondary fuel. Based at least in part on this/these determination(s), the controller 70 may be configured to optimize the ratio of the first amount of primary fuel to the second amount of secondary fuel to achieve a desired emissions level (e.g., a lowest emissions level overall or per unit power output) during operation of the internal combustion engine 30.

In some embodiments, the controller 70 may be configured to determine the first amount of primary fuel and the second amount of secondary fuel based at least in part on emissions data from a table correlating the first expected emissions from operation using primary fuel, the second expected emissions using secondary fuel, and/or the power output of the internal combustion engine 30 operating using the first amount of primary fuel and the second amount of secondary fuel. For example, such correlations may be based on calculations according to theoretical, mathematical, and/or scientific determinations as a function of the expected emissions due to operation using the primary fuel, the expected emissions due to operation using the secondary fuel, and/or the power output of the internal combustion engine 30 based on the combination of primary fuel and secondary fuel (e.g., a ratio of the amount of the primary fuel to the amount of the secondary fuel). In some examples, such correlations may be empirically-derived and/or estimated based at least in part on historical operation, testing, and/or simulated operation of the internal combustion engine 30.

In some embodiments, the controller 70 may be configured to determine the first amount of primary fuel and second amount of the secondary fuel for operation of the internal combustion engine 30, based at least in part on one or more formulas relating the expected emissions from operation using the primary fuel, the expected emissions from operation using the secondary fuel, and/or the power output of the internal combustion engine using the primary fuel and the secondary fuel. For example, such formulas may be derived according to theoretical, mathematical, and/or scientific determinations relating the expected emissions from operation using the primary fuel, the expected emissions from operation using the secondary fuel, and/or the power output of the internal combustion engine 30 based on the combination of primary fuel and secondary fuel (e.g., a ratio of the amount of the primary fuel to the amount of the secondary fuel). In some examples, such formulas may be empirically-derived and/or estimated based at least in part on historical operation, testing, and/or simulated operation of the internal combustion engine 30. During operation according to some examples, the amounts of primary and/or secondary fuel may be determined real-time, during operation of the internal combustion engine 30, for example, depending on the total power demand for operation of the hydraulic auxiliary components 32 and/or the electrical auxiliary components 34.

In still other embodiments, the controller 70 may be configured to cause the internal combustion engine 30 to operate according to two or more phases, depending at least in part on the total power load from the hydraulic auxiliary components 32 and/or the electrical auxiliary components 34. For example, the two or more phases may include a first phase during which operation of the internal combustion engine 30 using a combination of the first amount of primary fuel and the second amount of secondary fuel provides a power output at least equal to the total power load. The first amount of primary fuel may have an ability, when combusted, to produce a specific amount of energy, and similarly, the second amount of the secondary fuel may have an ability, when combusted, to produce a specific amount of energy. In some examples, according to operation during the first phase, the first amount of primary fuel and the second amount of secondary fuel include an amount of energy at least equal to the total power load. For example, during the first phase, if the internal combustion engine 30 is able to supply a sufficient amount of power without using solely the secondary fuel to meet the total power demand, the controller 70 may cause the internal combustion engine 30 to substitute an amount of primary fuel for an amount of the secondary fuel while still providing an amount of power sufficient to meet the total power load demanded, for example, as described herein.

In some embodiments, the two or more phases may include a second phase, for example, when the total power load is greater than a maximum amount of power output the internal combustion engine 30 is capable of producing using a combination of the primary fuel and the secondary fuel. In some such examples, the controller 70 may be configured to cause operation of the internal combustion engine using solely secondary fuel, so that the internal combustion engine 30 may operate to provide an amount of power to meet the total power load demanded and/or provide its maximum power output.

In some embodiments of the system 28, during operation of the internal combustion engine 30 according to the first phase, the controller 70 may be configured to determine the first amount of primary fuel and the second amount of secondary fuel based at least in part on a first efficiency of the primary fuel, a second efficiency of the secondary fuel, a first expected emissions generated during operation of the internal combustion engine using the first amount of primary fuel, and/or a second expected emissions generated during operation of the internal combustion engine 30 using the second amount of secondary fuel. In some examples, the effect of the efficiencies and/or emissions may be weighted, for example, to cause the effects to have a different level of influence on the outcome of the determination. For example, it may be desirable to achieve an operational efficiency of the internal combustion engine 30 that is above a threshold, and thus, the effects of the efficiencies of the primary and secondary fuel may be weighted relatively more heavily in the determination than the effects of emissions. Under some circumstances, the effect on emissions may be weighted relatively more heavily, for example, to reduce emissions to a level below a predetermined threshold, for example, to comply with government standards or regulations associated with emissions due to operation of the internal combustion engine 30.

Figure 2:
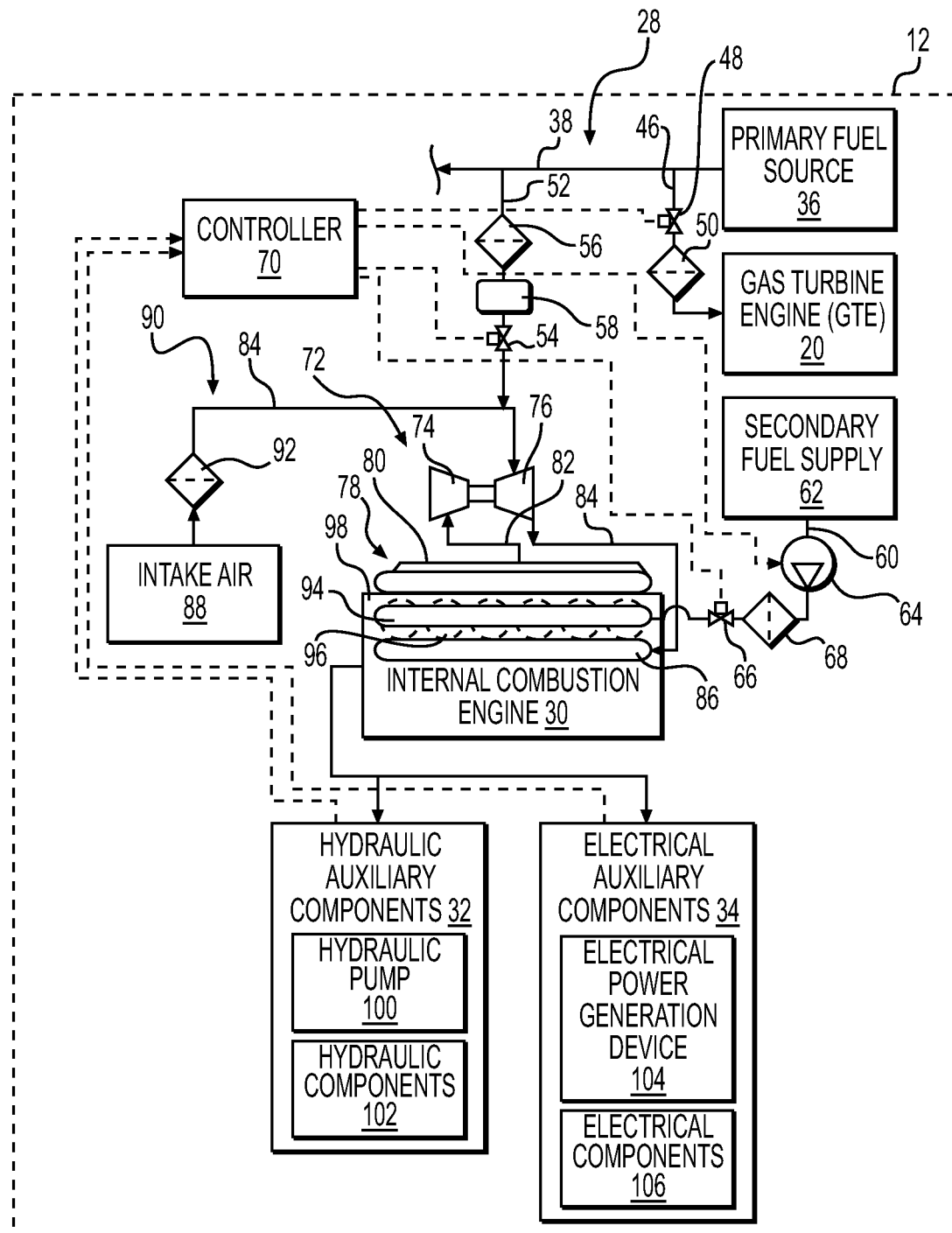
FIG. 2 is a schematic view of an example system for supplying primary fuel and secondary fuel to an example internal combustion engine to provide power for example hydraulic auxiliary components and example electrical auxiliary components according to an embodiment of the disclosure.

FIG. 2 is a schematic view of an example system 28 for supplying primary fuel and secondary fuel to an internal combustion engine 30 to provide power for example hydraulic auxiliary components 32 and example electrical auxiliary components 34 according to embodiments of the disclosure. As shown in FIG. 2, some examples of the internal combustion engine 30 may include a turbocharger 72 including a turbine 74 and a compressor 76 connected to the turbine 74 and configured to be driven by the compressor 76 during operation of the internal combustion engine 30, thereby increasing the intake pressure of the internal combustion engine 30 during operation to increase power output. For example, the internal combustion engine 30 may include an exhaust system 78, including an exhaust manifold 80 and an exhaust conduit 82 providing exhaust flow between the exhaust manifold 80 and the turbine 74 of the turbocharger 72.

During operation of the internal combustion engine 30, exhaust gas generated during combustion flows to the turbine 74 via the exhaust manifold 80 and the exhaust conduit 82, and energy in the exhaust gas is imparted to the turbine 74, causing it to spin and drive the compressor 76, which is in flow communication with an intake conduit 84, which supplies the compressed air to an intake manifold 86 of the internal combustion engine 30. Ambient intake air 88 is supplied via an intake 90 and the intake conduit 84 to the compressor 76 for compression. As shown, some examples, of the internal combustion engine 30 include an air filter 92 configured to remove or separate particulates from the air drawn into the intake 90.

As shown in FIG. 2, in some embodiments, the system 28 is configured such that the first manifold 52, which provides fluid flow between the primary fuel source 36 and the internal combustion engine 30 through the primary valve 54, intersects and feeds the intake conduit 84 upstream of the compressor 76 of the turbocharger 72, such that the primary fuel mixes with the ambient air in the intake conduit 84 prior to being compressed by the turbocharger 72. Once compressed by the compressor 76, the air and primary fuel mixture flows to the intake manifold 86, where it can be distributed for combustion in the internal combustion engine 30.

As shown, secondary fuel from the secondary fuel supply 62 may be pumped via the fuel pump 64 via the second manifold 60 through the secondary valve 66 to a fuel rail 94 and thereafter injected under pressure via fuel injectors directly into one or more cylinders 96 (e.g., into the combustion chambers) of a cylinder block 98 of the internal combustion engine 30. When operating using both primary fuel and secondary fuel, the primary fuel entering the intake manifold 86 and the secondary fuel entering the fuel rail 94, may be combined in the cylinders 96 (e.g., in the combustion chambers) for combustion by the internal combustion engine 30. By controlling operation of the primary valve 54, the fuel pump 64, and/or the secondary valve 66, the controller 70 is, in some examples, able to cause the internal combustion engine 30 to operate using solely primary fuel, solely secondary fuel, and/or a combination of primary fuel and secondary fuel. As explained previously herein, the controller 70 may be configured change the ratio of the amount of primary fuel to the amount of secondary fuel, for example, based on a load on the internal combustion engine 30, efficiencies associated with the primary fuel and/or the secondary fuel, and/or expected emissions from operation using the primary fuel and/or the secondary fuel.

As shown in FIG. 2, the hydraulic auxiliary components 32 may include one or more hydraulic pumps 100 and one or more hydraulic components 102. For example, the hydraulic auxiliary components 32 may be configured to supply hydraulic power for operation of hydraulic circuits on-board the hydraulic fracturing unit 12 including, for example, a hydraulic fluid reservoir, the one or more hydraulic pumps 100 for providing the hydraulic power to operate one or more of the hydraulic components 102, which may be incorporated into hydraulic circuits, such as flow control valves, metering valves, check valves, and/or one or more hydraulic actuators, such as hydraulic motors and hydraulic cylinders for preforming functions associated with operation of the hydraulic fracturing unit 12. Other hydraulic components are contemplated.

The example electrical auxiliary components 34 shown in FIG. 2 includes one or more electric power generation devices 104 and one or more electrical components 106. For example, the electrical auxiliary components 34 may include one or more electrical power generation devices 104 (e.g., alternators, generators, batteries, solar panels, etc.) for operation of electrical circuits including electrical components 106 associated with operation of the hydraulic fracturing unit 12, such as component controllers, instrumentation, sensors, and/or one or more electric actuators, such as electric motors and linear actuators. Other electrical components are contemplated.

Figure 3:
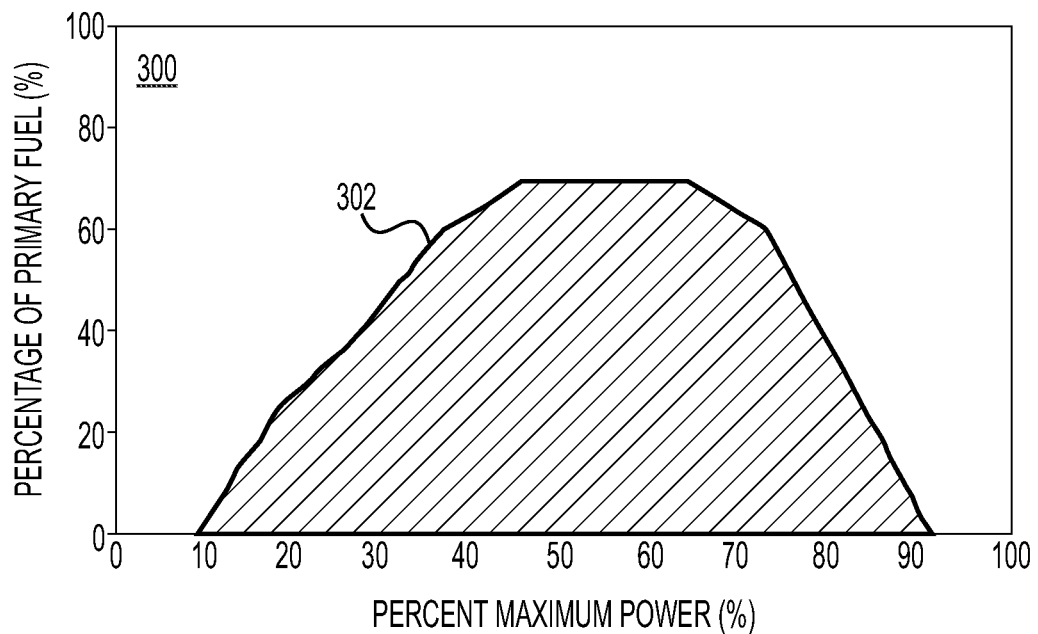
FIG. 3 is a graph showing an example relationship of percentage of primary fuel supplied to operate an internal combustion engine as a function of a percent of maximum power output by the internal combustion engine according to an embodiment of the disclosure.

FIG. 3 is a graph 300 showing an example relationship of percentage of primary fuel supplied to operate an internal combustion engine 30 as a function of a percentage of maximum power output by the internal combustion engine 30 as represented by the line 302, according to an embodiment of the disclosure. As shown in FIG. 3, in some examples, the controller 70 may be configured to begin substituting primary fuel for secondary fuel at a power output of about 10 percent of the maximum power output of the internal combustion engine 30. In some examples, the controller 70 may be configured to begin substituting primary fuel for secondary fuel at a power output ranging from about 10 percent to about 30 percent (e.g., ranging from about 20 percent to about 25 percent) of the maximum power output of the internal combustion engine 30.

As shown in FIG. 3, the controller 70 may be configured to increase the amount of substitution of primary fuel for secondary fuel as the power output of the internal combustion engine 30 increases from about 10 percent to about 50 percent of the maximum power output, with the percentage of primary fuel rising to an amount ranging from about 70 percent to about 80 percent. In the example shown, the controller 70 may be configured to substantially maintain the substitution rate of primary fuel for secondary fuel at a range of about 70 percent to about 80 percent at a power output ranging from about 50 percent to about 80 percent of the maximum power output of the internal combustion engine 30 (e.g., from about 50 percent to about 65 percent or 70 percent). Beginning at about 65 percent to about 80 percent of the maximum power output of the internal combustion engine 30, the controller 70 may be configured to begin reducing the rate of substitution of primary fuel for secondary fuel, and by about 85 percent to about 95 percent of the maximum power output, the controller 70 may be configured to reduce the rate of substitution of primary fuel for secondary fuel to about zero. In some examples of the internal combustion engine 30, the primary fuel, and the secondary fuel, the internal combustion engine 30 may not be capable of a power output of greater than about 85 percent to about 95 percent of maximum power during operation using any primary fuel, and thus, in some such examples, the controller 70 may be configured to cease substitution of primary fuel for secondary fuel at power outputs greater than about 85 percent to about 95 percent of maximum power, so that the internal combustion engine 30 operates solely using secondary fuel to achieve the desired power output. For example, the primary fuel may not have a sufficient amount of potential energy per unit volume for the internal combustion engine 30 to operate close to its maximum power output, while in contrast, the secondary fuel may have a sufficient amount of potential energy per unit volume for the internal combustion engine 30 to operate close to, or at, its maximum power output.

As shown in the example of FIG. 3, in instances in which operating the internal combustion engine 30 using primary fuel is relatively more efficient (e.g., with respect to cost) than operating the internal combustion engine 30 using secondary fuel, it may be desirable, with respect to efficiency, to operate the internal combustion engine 30 at a power output ranging from about 40 percent to about 80 percent (e.g., from about 45 percent to about 70 percent) of the maximum power output of the internal combustion engine 30, such that the amount of primary fuel substituted for secondary fuel is substantially maintained at an amount ranging from about 60 percent to about 80 percent. Different ranges of power output and/or substitution rates of primary fuel for secondary fuel are contemplated, depending, for example, on the internal combustion engine 30, the primary fuel, and/or the secondary fuel.

Figure 4:
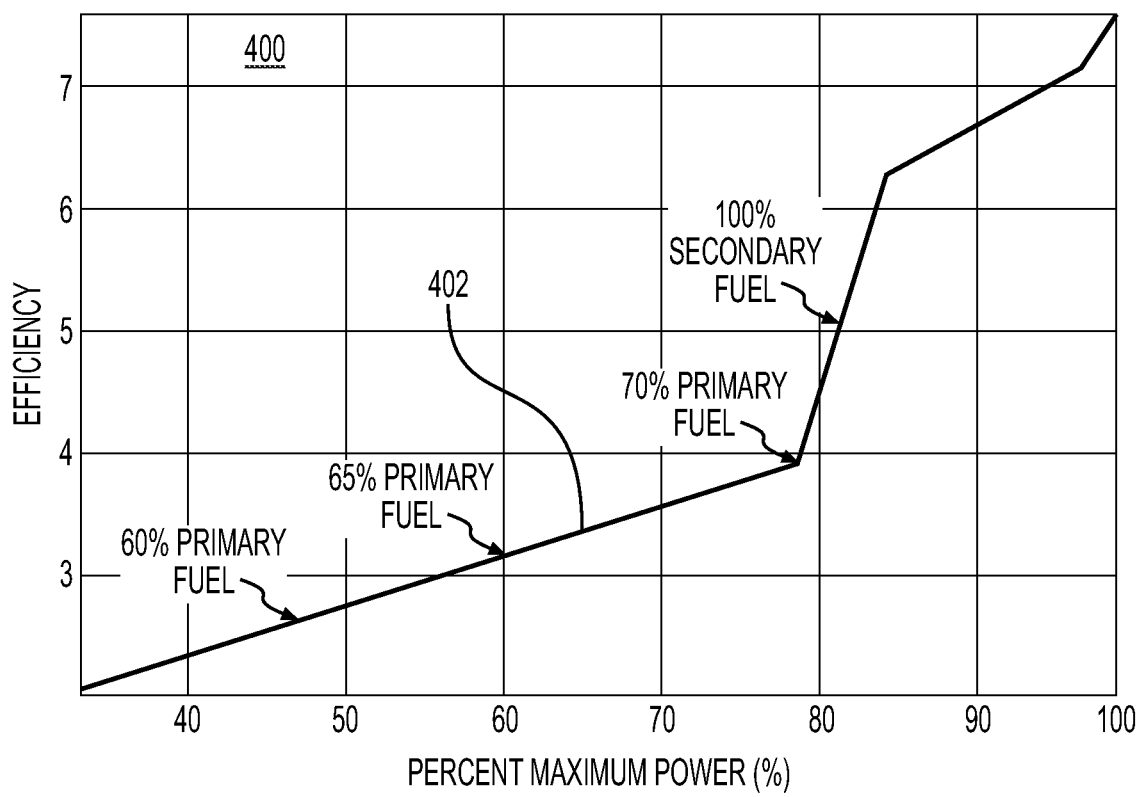
FIG. 4 is a graph showing an example relationship of efficiency of an internal combustion engine as a function of a percentage of maximum power output by the internal combustion engine according to an embodiment of the disclosure.

FIG. 4 is a graph 400 showing an example relationship of efficiency associated with operation of an internal combustion engine 30 as a function of a percentage of maximum power output by the internal combustion engine 30 as represented by the line 402, according to an embodiment of the disclosure. FIG. 4 shows a reduction in efficiency as an increase along the Y-axis of the graph 400 as a unit-less magnitude ranging from about 2 to about 7.5. The efficiency may be determined, for example, based at least in part on one or more factors, such as power usage, cost of operation (e.g., including fuel cost), time to delivery of power output, type or types of fuel(s) used for operation, the suitability of the fuel(s) for operation, the completeness of combustion of the fuel(s), the quality of the fuel(s), and/or the emissions generated during combustion of the fuel(s).

For example, as shown in FIG. 4, a reduction in efficiency may occur as the internal combustion engine 30 increases its power output, shown on the X-axis as a percentage of the maximum power output of the internal combustion engine 30. Thus, in general, in the example shown, as the power output of the internal combustion engine 30 increases, its efficiency may be thought of as decreasing, for example, because relatively more fuel may be required to operate the internal combustion engine 30 at relatively higher power outputs. This does not preclude the possibility that, in some examples, operation of the internal combustion engine 30 at relatively higher power outputs may be relatively more efficient, for example, due to the power output being a greater percentage of the maximum possible power output due to the potential energy of the fuel or fuels supplied to the internal combustion engine 30 for operation (e.g., due to more complete combustion).

In some examples, a reduction in efficiency may occur as the internal combustion engine 30 increases its power output, as shown in FIG. 4, which may correlate to an increase in cost of operation of the internal combustion engine 30 due, for example, to the cost of the secondary fuel being relatively more expensive per unit volume than the cost of primary fuel per unit volume. Thus, in general in the example shown, as more primary fuel is substituted for secondary fuel, the reduction in efficiency (e.g., the increase in cost) does not increase as quickly as the internal combustion engine 30 is operated at a higher percentage of its maximum power output and more total fuel is required to produce a greater power output by the internal combustion engine 30. Thus, although the cost increases due to the increase in power output (e.g., the reduction in efficiency increases), by using a greater percentage of primary fuel, which costs less per unit volume than the secondary fuel in the example, the rate of increase in cost is reduced, with the rate of increase in cost being represented by the slope of the line 402.

In some embodiments, as shown in FIG. 4, as the load on the internal combustion engine 30 increases, such that the percentage of the maximum power output of the internal combustion engine 30 at which the internal combustion engine 30 operates increases to meet the increasing load, the efficiency reduction of operation of the internal combustion engine 30 increases (e.g., the cost increases), as shown by the upward trend in line 402 as the power output increases. For example, when the internal combustion engine 30 is operated at a power output ranging from less than about 40 percent of maximum power output to less than about 80 percent of the maximum power output, the internal combustion engine 30 is able to be operated using an increasing percentage of the primary fuel (from less than about 60 percent to about 70 percent primary fuel) and a corresponding decreasing percentage of the secondary fuel. At operation above 80 percent maximum power output, in order to supply a power output sufficient to meet the increasing load on the internal combustion engine 30, in some embodiments, operation reverts to operation using solely (e.g., 100 percent) the secondary fuel, for example, because the primary fuel does not have sufficient energy to meet the load demands by operating at above 80 percent of maximum power output, for example, as explained with respect to FIG. 3. Under these circumstances, according to some embodiments, if use of the secondary fuel for operation is less efficient (e.g., less cost-effective) than use of the primary fuel, the efficiency reduction increases, for example, as shown by the slope of line 402 increasing as the internal combustion engine 30 is operated at a power output above about 75 percent to about 80 percent of the maximum power output of the internal combustion engine 30.

Figure 5:
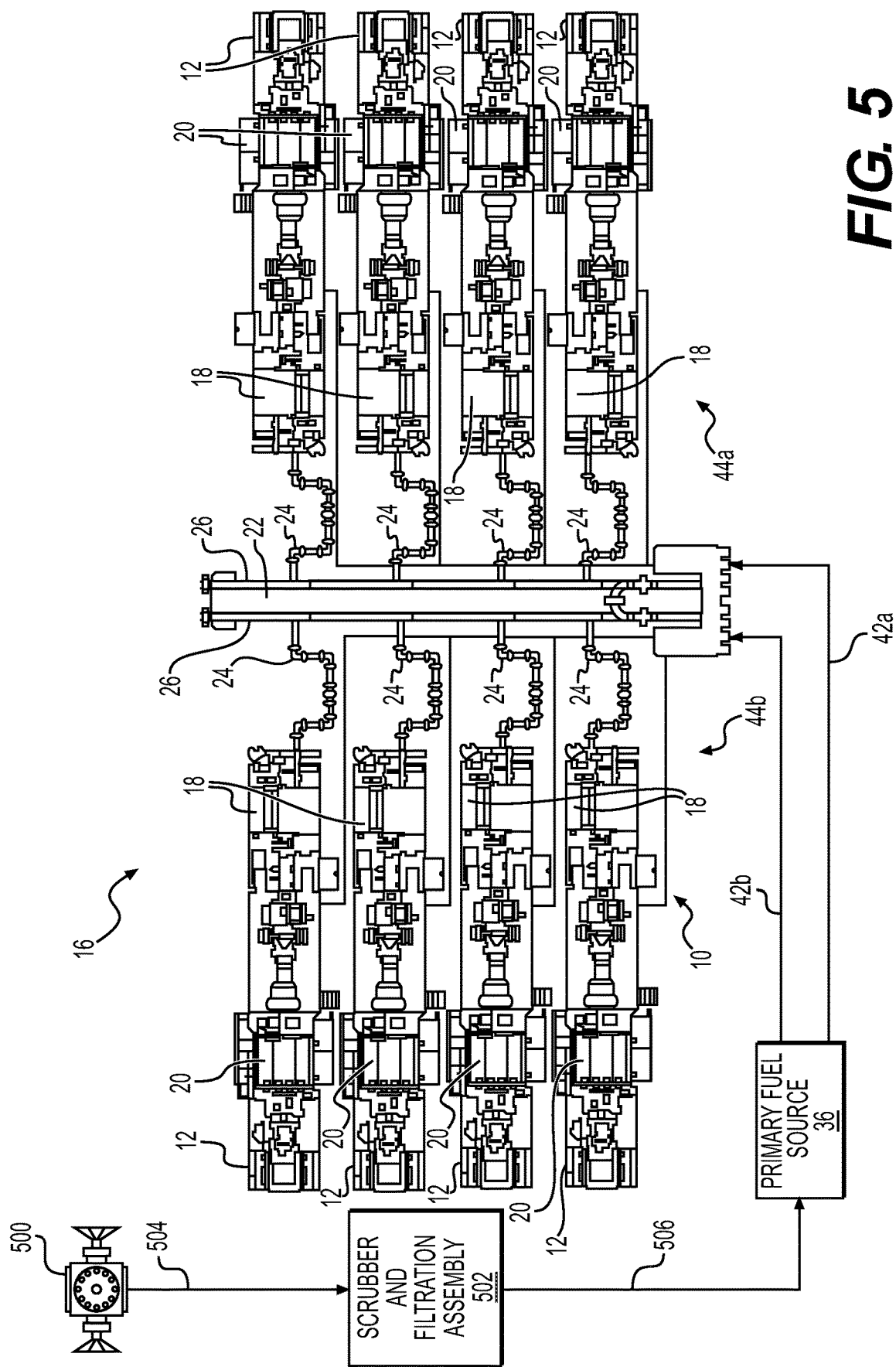
FIG. 5 is a schematic view of another example fracturing system including a plurality of hydraulic fracturing units receiving primary fuel from an example primary fuel source according to an embodiment of the disclosure.

FIG. 5 is a schematic view of another embodiment of a hydraulic fracturing system 16, including a plurality of hydraulic fracturing units 12 receiving primary fuel from an example primary fuel source 36 according to embodiments of the disclosure. In the example shown in FIG. 5, the original source of the primary fuel is a wellhead 500 of a natural gas well located close to the hydraulic fracturing system 16, which may provide a convenient and/or cost-effective source of the primary fuel. In some such examples, natural gas may flow to a scrubber and filtration system 502 via a first gas fuel line 504 and thereafter flow to the primary fuel source 36 via a second gas fuel line 506. Thereafter, the primary fuel may flow from the primary fuel source 36 via the first fuel line 42a and the second fuel line 42b, for example, similar to as shown in FIG. 1. Other fuel delivery arrangements are contemplated, such as, for example, "daisy-chain" arrangements, "hub-and-spoke" arrangements, combination "daisy-chain" and "hub-and-spoke" arrangements, and/or modifications of such arrangements.

Figure 6:
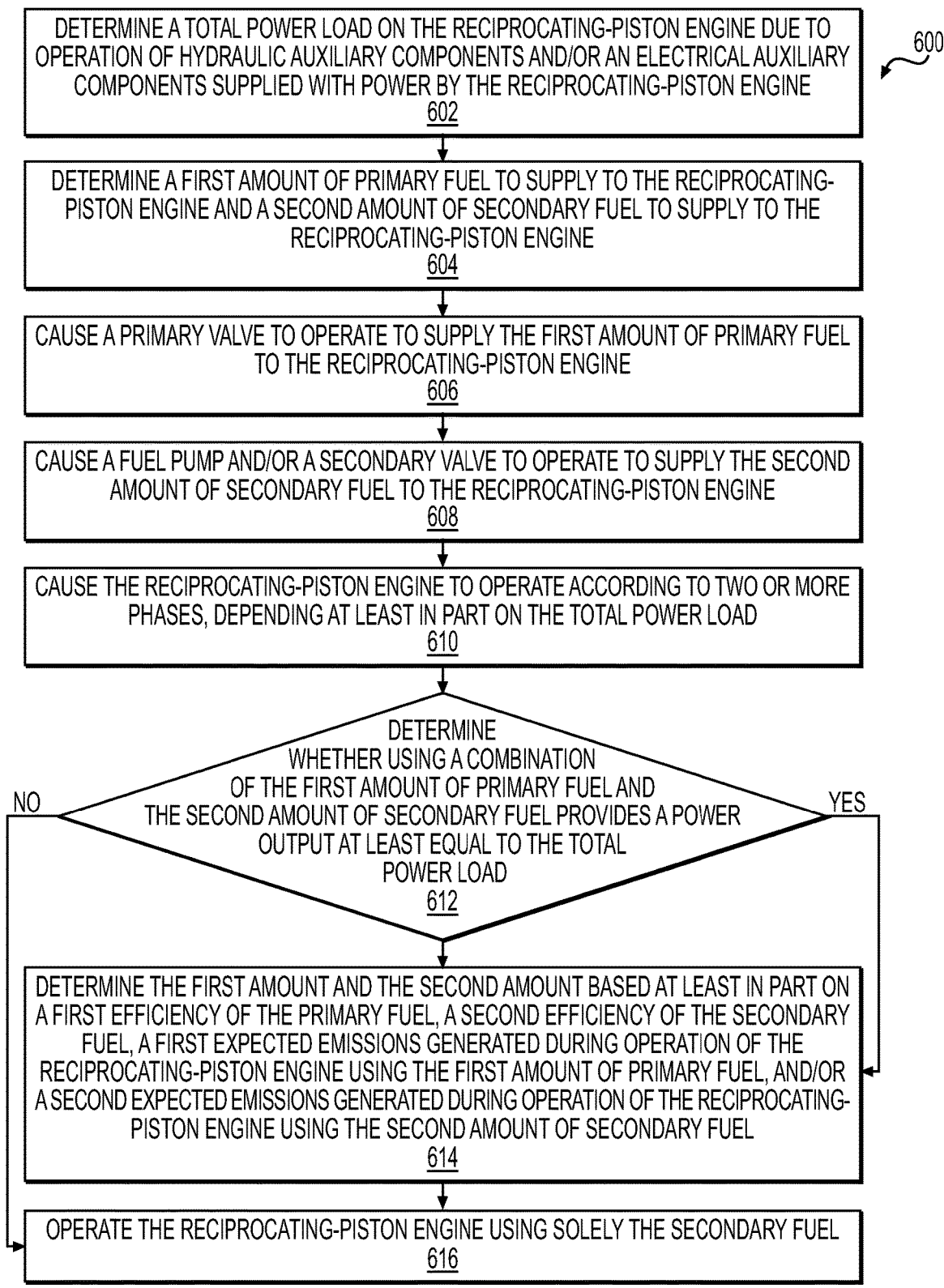
FIG. 6 is a block diagram of an example method for supplying primary fuel and secondary fuel to a reciprocating-piston engine according to an embodiment of the disclosure.

FIG. 6 is a block diagram of an example method 600 for supplying primary fuel and secondary fuel to a reciprocating-piston engine according to embodiments of the disclosure, illustrated as a collection of blocks in a logical flow graph, which represent a sequence of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described blocks can be combined in any order and/or in parallel to implement the methods.

FIG. 6 is a flow diagram of an embodiment of a method 600 for supplying primary fuel and secondary fuel to a reciprocating-piston engine, for example, associated with a hydraulic fracturing unit of a hydraulic fracturing system, according to embodiments of the disclosure. In some examples, the method 600 may be performed semi- or fully-autonomously, for example, via a controller. The method 600 may be utilized in association with various systems, such as, for example, the example system 28 shown in one or more of FIGS. 1 and 2.

The example method 600, at 602, may include determining a total power load on the reciprocating-piston engine due to operation of hydraulic auxiliary components supplied with power by the reciprocating-piston engine and/or electrical auxiliary components supplied with power by the reciprocating-piston engine. For example, a controller may receive one or more signals indicative of operation of one or more of the hydraulic auxiliary components or the electrical auxiliary components, for example, as described previously herein. In some examples, the one or more signals may include one or more signals generated by one or more sensors associated with the hydraulic auxiliary components or the electrical auxiliary components.

At 604, the example method 600 may further include determining a first amount of primary fuel to supply to the reciprocating-piston engine and a second amount of secondary fuel to supply to the reciprocating-piston engine, for example, based at least in part on the total power load. For example, the controller may be configured determine the first amount and the second amount based at least in part on an efficiency of the primary fuel relative to an efficiency of the secondary fuel, for example, as described previously herein. In some examples, the controller may be configured to determine the first amount and the second amount based at least in part on first expected emissions generated during operation of the reciprocating-piston engine using the first amount of primary fuel or second expected emissions generated during operation of the reciprocating-piston engine using the second amount of secondary fuel, for example, as previously described herein.

At 606, the example method 600 may also include causing a primary valve to operate to supply the first amount of primary fuel to the reciprocating-piston engine, for example, based at least in part on the first amount of the primary fuel and the second amount of the secondary. For example, the controller may be configured to cause the primary valve to open and/or meter primary fuel to supply the reciprocating-piston engine, for example, as described previously herein.

The example method 600, at 608, may further include causing a fuel pump and/or a secondary valve to operate to supply the second amount of secondary fuel to the reciprocating-piston engine, for example, based at least in part on the first amount of the primary fuel and the second amount of the secondary. For example, the controller may be configured to cause the fuel pump and/or the secondary valve to open and/or meter secondary fuel to supply the reciprocating-piston engine, for example, as described previously herein.

The example method 600, at 610, may also include causing the reciprocating-piston engine to operate according to two or more phases, depending at least in part on the total power load.

For example, at 612, the example method 600 may also include determining whether using a combination of the first amount of primary fuel and the second amount of the secondary fuel provides a power output at least equal to the total power load. For example, the controller may determine whether the primary fuel has enough energy per unit mass to provide an amount of energy sufficient to supply the reciprocating piston-engine to provide a power output at least equal to the total power load. If so, a combination of the primary fuel and secondary fuel may be used to supply the reciprocating-piston engine.

If, at 612, it has been determined that using a combination of the first amount of primary fuel and the second amount of the secondary fuel provides a power output at least equal to the total power load, at 614, the example method 600 may further include determining the first amount of primary fuel and the second amount of secondary fuel based at least in part on considerations related to efficiency and/or emissions. For example, the considerations may relate to a first efficiency of the primary fuel, a second efficiency of the secondary fuel, a first expected emissions generated during operation of the reciprocating-piston engine using the first amount of primary fuel, and/or a second expected emissions generated during operation of the reciprocating-piston engine using the second amount of secondary fuel. For example, the controller may be configured to access tables and or perform calculations to determine a combination of the first amount of primary fuel and the second amount of secondary fuel to provide a power output sufficient to meet the power demand corresponding to the total power load, for example, as described previously herein.

If, at 612, it has been determined that using a combination of the first amount of primary fuel and the second amount of the secondary fuel will not provide a power output at least equal to the total power load, at 616, however, the example method 600 further may include operating the reciprocating-piston engine using solely the secondary fuel. For example, as described above, the controller may determine that it is not possible to meet the total power load demand using any of the primary fuel and determine that the reciprocating-piston engine should be operated using solely the secondary fuel, which may produce more power than the primary fuel.

It should be appreciated that subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, mobile telephone devices, tablet computing devices, special-purposed hardware devices, network appliances, and the like.

The controller 80 can include one or more industrial control systems (ICS), such as supervisory control and data acquisition (SCADA) systems, distributed control systems (DCS), and/or programmable logic controllers (PLCs). For example, the controller 80 may include one or more processors, which may operate to perform a variety of functions, as set forth herein. In some examples, the processor(s) may include a central processing unit (CPU), a graphics processing unit (GPU), both CPU and GPU, or other processing units or components. Additionally, at least some of the processor(s) may possess local memory, which also may store program modules, program data, and/or one or more operating systems. The processor(s) may interact with, or include, computer-readable media, which may include volatile memory (e.g., RAM), non-volatile memory (e.g., ROM, flash memory, miniature hard drive, memory card, or the like), or some combination thereof. The computer-readable media may be non-transitory computer-readable media. The computer-readable media may be configured to store computer-executable instructions, which when executed by a computer, perform various operations associated with the processor(s) to perform the operations described herein.

Example embodiments of the controller 70 may be provided as a computer program item including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, example embodiments may also be provided as a computer program item including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks.

Having now described some illustrative embodiments of the disclosure, it should be apparent to those skilled in the art that the foregoing is merely illustrative and not limiting, having been presented by way of example only. Numerous modifications and other embodiments are within the scope of one of ordinary skill in the art and are contemplated as falling within the scope of the disclosure. In particular, although many of the examples presented herein involve specific combinations of method acts or system elements, it should be understood that those acts and those elements may be combined in other ways to accomplish the same objectives. Those skilled in the art should appreciate that the parameters and configurations described herein are exemplary and that actual parameters and/or configurations will depend on the specific application in which the systems and techniques of the invention are used. Those skilled in the art should also recognize or be able to ascertain, using no more than routine experimentation, equivalents to the specific embodiments of the invention. It is, therefore, to be understood that the embodiments described herein are presented by way of example only and that, within the scope of any appended claims and equivalents thereto, the embodiments of the disclosure may be practiced other than as specifically described.

This U.S. Non-Provisional patent application claims priority to and the benefit of, under 35 U.S.C. § 119(e), U.S. Provisional Application No. 62/705,188, filed Jun. 15, 2020, titled "BI-FUEL RECIPROCATING ENGINE TO POWER ONBOARD FRACTURING PUMP AUXILIARY SYSTEMS AND RELATED METHODS," and U.S. Provisional Application No. 62/704,774, filed May 28, 2020, titled "SYSTEMS AND METHODS FOR SUPPLYING PRIMARY FUEL AND SECONDARY FUEL TO AN INTERNAL COMBUSTION ENGINE OF A FRACTURING UNIT," the disclosures of both of which are incorporated herein by reference in their entirety.

Furthermore, the scope of the present disclosure shall be construed to cover various modifications, combinations, additions, alterations, etc., above and to the above-described embodiments, which shall be considered to be within the scope of this disclosure. Accordingly, various features and characteristics as discussed herein may be selectively interchanged and applied to other illustrated and non-illustrated embodiment, and numerous variations, modifications, and additions further can be made thereto without departing from the spirit and scope of the present invention as set forth in the appended claims.

What is claimed is:

1. A method for supplying primary fuel and secondary fuel to a reciprocating-piston engine, the method comprising:
   receiving one or more signals indicative of one or more of: a hydraulic power load on the reciprocating-piston engine due to operation of one or more of hydraulic auxiliary components supplied with power by the reciprocating-piston engine, or an electric power load on the reciprocating-piston engine due to electrical auxiliary components supplied with power by the reciprocating-piston engine;
   determining, based at least in part on the one or more signals, a total power load on the reciprocating-piston engine;
   determining, based at least in part on the total power load, a first amount of primary fuel to supply to the reciprocating-piston engine and a second amount of secondary fuel to supply to the reciprocating-piston engine; and
   causing, based at least in part on the first amount and the second amount, one or more of:
      a primary valve to operate to supply the first amount of primary fuel to the reciprocating-piston engine; or
      one or more of a fuel pump or a secondary valve to operate to supply the second amount of secondary fuel to the reciprocating-piston engine.

2. The method of claim 1, further comprising increasing the first amount of primary fuel relative to the second amount of secondary fuel as the total power load increases up to a first total power load and decreasing the first amount of primary fuel relative to the second amount of secondary fuel as the total power load increases beyond the first total power load.

3. The method of claim 1, wherein:
   determining the first amount of primary fuel and the second amount of secondary fuel comprises determining the first amount and the second amount based at least in part on an efficiency of the primary fuel relative to an efficiency of the secondary fuel; and
   determining the first amount and the second amount is based at least in part on one or more of:
      efficiency data from a table correlating one or more of the efficiency of the primary fuel, the efficiency of the secondary fuel, or power output of the reciprocating-piston engine operating using the primary fuel and the secondary fuel; or
      a formula relating the efficiency of the primary fuel, the efficiency of the secondary fuel, and the power output of the reciprocating-piston engine using the primary fuel and the secondary fuel.

4. The method of claim 1, wherein:
   determining the first amount and the second amount is based at least in part on one or more of first expected emissions generated during operation of the reciprocating-piston engine using the first amount of primary fuel or second expected emissions generated during operation of the reciprocating-piston engine using the second amount of secondary fuel; and
   determining the first amount and the second amount is based at least in part on one or more of:
      emissions data from a table correlating one or more of the first expected emissions, the second expected emissions, or power output of the reciprocating-piston engine operating using the primary fuel and the secondary fuel; or
      a formula relating the first expected emissions, the second expected emissions, and the power output of the reciprocating-piston engine using the primary fuel and the secondary fuel.

5. The method of claim 1, further comprising:
   causing the reciprocating-piston engine to operate according to two or more phases, depending at least in part on the total power load, the two or more phases comprising:
      a first phase during which operation of the reciprocating-piston engine using a combination of the first amount of primary fuel and the second amount of secondary fuel provides a power output at least equal to the total power load; and
      a second phase when the total power load is greater than a maximum amount of power output that the reciprocating-piston engine is capable of producing using a combination of the primary fuel and the secondary fuel, and during which the reciprocating-piston engine operates using solely the secondary fuel,
   wherein during operation of the reciprocating-piston engine according to the first phase, the method further comprises determining the first amount and the second amount based at least in part on one or more of a first efficiency of the primary fuel, a second efficiency of the secondary fuel, a first expected emissions generated during operation of the reciprocating-piston engine using the first amount of primary fuel, or a second expected emissions generated during operation of the reciprocating-piston engine using the second amount of secondary fuel.

6. The method of claim 1, wherein determining the first amount and the second amount comprises determining the first amount and the second amount such that the first amount of primary fuel and the second amount of secondary fuel comprises an amount of energy at least equal to the total power load.

* * * * *